(12) United States Patent
Zhang et al.

(10) Patent No.: US 11,737,082 B2
(45) Date of Patent: *Aug. 22, 2023

(54) SIGNAL TRANSMISSION METHOD AND COMMUNICATIONS APPARATUS

(71) Applicant: HUAWEI TECHNOLOGIES CO., LTD., Guangdong (CN)

(72) Inventors: Di Zhang, Shenzhen (CN); Xu Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,404

(22) Filed: Apr. 27, 2022

(65) Prior Publication Data

US 2022/0256567 A1 Aug. 11, 2022

Related U.S. Application Data

(63) Continuation of application No. 16/654,269, filed on Oct. 16, 2019, now Pat. No. 11,337,235, which is a (Continued)

(30) Foreign Application Priority Data

Sep. 28, 2018 (CN) .......................... 201811143507.7

(51) Int. Cl.
*H04W 72/1263* (2023.01)
*H04W 76/27* (2018.01)
(Continued)

(52) U.S. Cl.
CPC ....... *H04W 72/1263* (2013.01); *H04L 5/0092* (2013.01); *H04W 56/001* (2013.01);
(Continued)

(58) Field of Classification Search
CPC . H04W 72/042; H04W 76/27; H04W 72/046; H04W 72/1263; H04W 80/02;
(Continued)

(56) References Cited

U.S. PATENT DOCUMENTS

2019/0069285 A1* 2/2019 Chandrasekhar .... H04B 7/0695
2019/0141693 A1* 5/2019 Guo ....................... H04W 16/14
(Continued)

FOREIGN PATENT DOCUMENTS

| CN | 108288984 | 7/2018 |
|----|-----------|--------|
| CN | 108288991 | 7/2018 |
| WO | 2018174803 | 9/2018 |

OTHER PUBLICATIONS

3GPP TS 38.213 V15.2.0 (Jun. 2018), "3rd Generation Partnership Project; Technical Specification Group Radio Access Network; NR; Physical layer procedures for control (Release 15)," Jun. 2018, 99 pages.

(Continued)

*Primary Examiner* — Mehmood B. Khan
(74) *Attorney, Agent, or Firm* — Fish & Richardson P.C.

(57) ABSTRACT

This application provides a signal transmission method and a communications apparatus. One example method includes: receiving, by a terminal device, configuration information, where the configuration information is used to configure the terminal device to transmit M signals in a first time unit, the terminal device has N antenna panels, M is an integer greater than or equal to 1, and N is an integer greater than or equal to 2; and transmitting, by the terminal device, at least one of the M signals based on first information by using at least one of the N antenna panels.

32 Claims, 4 Drawing Sheets

Related U.S. Application Data continuation of application No. PCT/CN2019/092856, filed on Jun. 25, 2019.

(51) Int. Cl.

| | | |
|---|---|---|
| *H04L 5/00* | (2006.01) | |
| *H04W 56/00* | (2009.01) | |
| *H04W 72/044* | (2023.01) | |
| *H04W 80/02* | (2009.01) | |
| *H04W 72/23* | (2023.01) | |

(52) U.S. Cl.
CPC ......... *H04W 72/046* (2013.01); *H04W 72/23* (2023.01); *H04W 76/27* (2018.02); *H04W 80/02* (2013.01)

(58) Field of Classification Search
CPC .. H04W 56/001; H04L 5/0035; H04L 5/0053; H04L 5/0092; H04L 5/001; H04L 5/0051; H04L 5/0064; H04L 5/0023; H04L 5/005; H04B 7/024; H04B 7/0695
See application file for complete search history.

(56) References Cited

U.S. PATENT DOCUMENTS

| | | | | |
|---|---|---|---|---|
| 2019/0230545 | A1* | 7/2019 | Liou | H04W 24/10 |
| 2019/0253308 | A1* | 8/2019 | Huang | H04L 43/0823 |
| 2019/0254120 | A1* | 8/2019 | Zhang | H04W 88/10 |
| 2019/0274169 | A1* | 9/2019 | Tsai | H04W 56/0045 |
| 2019/0297603 | A1* | 9/2019 | Guo | H04L 5/0051 |
| 2019/0297640 | A1* | 9/2019 | Liou | H04L 5/0053 |
| 2019/0334592 | A1 | 10/2019 | Han et al. | |
| 2019/0342907 | A1* | 11/2019 | Huang | H04W 72/23 |
| 2019/0349059 | A1* | 11/2019 | John Wilson | H04L 5/0091 |
| 2019/0349964 | A1* | 11/2019 | Liou | H04L 5/0094 |
| 2020/0053703 | A1* | 2/2020 | Akkarakaran | H04L 27/2602 |
| 2020/0053717 | A1* | 2/2020 | Zhou | H04B 7/088 |
| 2020/0092860 | A1* | 3/2020 | Khoshnevisan | H04W 76/27 |
| 2020/0280483 | A1* | 9/2020 | Zhang | H04W 72/04 |
| 2021/0028984 | A1* | 1/2021 | Da Silva | H04L 5/0048 |

OTHER PUBLICATIONS

3GPP TS 38.321 V15.3.0 (Sep. 2018), "3rd Generation Partnership Project; Technical Specification Group Radio Access Network; NR; Medium Access Control (MAC) protocol specification (Release 15)," Sep. 2018, 76 pages.

3GPP TS 38.331 V15.3.0 (Sep. 2018), "3rd Generation Partnership Project; Technical Specification Group Radio Access Network; NR; Radio Resource Control (RRC) protocol specification (Release 15)," Sep. 2018, 445 pages.

Extended European Search Report issued in European Application No. 19798146.7 dated Apr. 20, 2020, 9 pages.

Huawei et al., "Coreset configuration and search space design," 3GPP TSG RAN WG1 Meeting #91, R1-1719387; Reno, USA, XP051369296, Nov. 27-Dec. 1, 2017, 14 pages.

Nokia, "Summary of QCL," 3GPP TSG RAN WG1#89, R1-1709298, Hangzhou, P.R. China, May 15-19, 2017, 10 pages.

NTT Docomo, Inc., "[92b—NR-03] Necessary information for search space configuration," 3GPP TSG RAN WG1 Meeting #92bis, R1-1805439; Sanya, China, XP051461524, Apr. 16-20, 2018, 12 pages.

NTT Docomo, Inc., "Maintenance for physical downlink control channel," 3GPP TSG RAN WG1 Meeting #94, R1-1809141; Gothenburg, Sweden, XP051516511, Aug. 20-24, 2018, 28 pages.

Office Action issued in Indian Application No. 202147018256 dated Feb. 9, 2022, 7 pages.

PCT International Search Report and Written Opinion issued in International Application No. PCT/CN2019/092856 dated Sep. 30, 2019, 13 pages.

Qualcomm Incorporated, "Beam management for NR," 3GPP TSG-RAN WG1 Meeting 92bis, R1-1804787; Sanya, China, XP051414143, Apr. 16-20, 2018, 4 pages.

Ericsson, "Feature Lead Summary for Beam Management—Thursday," 3GPP TSG-RAN WG1 Meeting #94, R1-1809864, Gothenburg, Sweden, Aug. 20-24, 2018, 6 pages.

Nokia et al., "TCI States Configuration for Coreset#0," 3GPP TSG-RAN WG2 Meeting #103bis, R2-1814985, Chengdu, China, Oct. 8-12, 2018, 3 pages.

Office Action issued in Japanese Application No. 2021-517658 dated May 30, 2022, 9 pages (with English translation).

Spreadtrum Communications, "Remaining Issues on Reference Signals," 3GPP TSG RAN WG1 Meeting #94, R1-1808801, Gothenburg, Sweden, Aug. 20-24, 2018, 5 pages.

* cited by examiner

SIGNAL TRANSMISSION METHOD AND COMMUNICATIONS APPARATUS

CROSS-REFERENCE TO RELATED APPLICATIONS

This application is a continuation of U.S. patent application Ser. No. 16/654,269, filed on Oct. 16, 2019, which is a continuation of International Application No. PCT/CN2019/092856, filed on Jun. 25, 2019. The International Application claims priority to Chinese Patent Application No. 201811143507.7, filed on Sep. 28, 2018. All of the aforementioned patent applications are hereby incorporated by reference in their entireties.

TECHNICAL FIELD

This application relates to the communications field, and in particular, to a signal transmission method and a communications apparatus.

BACKGROUND

In a wireless communications system, to improve transmission efficiency while ensuring transmission reliability, a network device generally estimates quality of a radio channel used for signal transmission, and determines a scheduling scheme based on the quality of the radio channel.

To overcome a relatively high propagation loss, a signal transmission mechanism based on a beamforming technology is used to compensate for the loss in a signal propagation process by using a relatively high antenna gain.

After beam training, N (N is an integer greater than or equal to 1) best beam pairs (beam pair link, BPL) used for communication may be determined between the network device and a terminal device. During communication, the network device and the terminal device may use at least one of the N BPLs for signal transmission.

In long term evolution (long term evolution, LTE), one terminal device has only one beam (beam). However, in new radio (new radio, NR), one terminal device may have a plurality of antenna panels (panel), and may support a plurality of beams. For a terminal device, how to select an antenna panel to transmit a signal when the terminal device has a plurality of antenna panels is not mentioned in content of an existing protocol.

Therefore, a problem to be urgently resolved is how the terminal device selects an antenna panel to transmit a signal when the network device instructs the terminal device to transmit one signal or simultaneously transmit a plurality of signals.

SUMMARY

This application provides a signal transmission method and a communications apparatus, so that a terminal device can select an antenna panel for transmitting a signal and/or a signal that needs to be transmitted.

According to a first aspect, a data transmission signal is provided. The method includes: receiving, by a terminal device, configuration information, where the configuration information is used to configure the terminal device to transmit M signals in a first time unit, the terminal device has N antenna panels, M is an integer greater than or equal to 1, and N is an integer greater than or equal to 2; and transmitting, by the terminal device, at least one of the M signals based on first information by using at least one of the N antenna panels.

It should be understood that, in this embodiment of this application, the terminal device may determine at least one antenna panel and/or at least one signal based on the first information. To be specific, in this embodiment of this application, the terminal device may transmit a part or all of the M signals by using all or a part of the N antenna panels.

In this embodiment of this application, the terminal device can select, based on the first information, an antenna panel for transmitting a signal and/or a signal that needs to be transmitted. This embodiment of this application provides a solution of determining a signal that needs to be transmitted, and resolves a problem that a terminal device cannot select an antenna panel for transmitting a signal when a network device instructs the terminal device to transmit one signal, or a problem that a terminal device cannot select an antenna panel for transmitting a signal and/or a signal that needs to be transmitted when a network device instructs the terminal device to simultaneously transmit a plurality of signals.

It should be understood that, in this embodiment of this application, the first time unit may be a period of time. For example, the first time unit may be one or more orthogonal frequency division multiplexing (orthogonal frequency division multiplexing, OFDM) symbols, one or more slots, or one or more subframes. This is not limited in this embodiment of this application.

In this embodiment of this application, the M signals may completely overlap in time, or the M signals partly overlap in time. This is not limited in this embodiment of this application.

That the M signals completely overlap in time may indicate that time of transmitting all of the M signals configured by the network device is the same. For example, all the signals are transmitted on an OFDM symbol 1. That the M signals partly overlap in time may indicate that time of transmitting signals in the M signals configured by the network device does not completely overlap. For example, in the M signals configured by the network device, a first signal is transmitted on the OFDM symbol 1 to an OFDM symbol 3, a second signal is transmitted on the OFDM symbol 1 to an OFDM symbol 2, and a third signal is transmitted on the OFDM symbol 2 to the OFDM symbol 3. In this case, the first signal to the third signal partly overlap in time, that is, overlap on the OFDM symbol 2.

It should be understood that, in this embodiment of this application, the configuration information may include one piece of information or may include a plurality of pieces of information. For example, the configuration information may include at least one of radio resource control (radio resource control, RRC) information, medium access control (medium access control, MAC) information, or downlink control information (downlink control information, DCI).

When the configuration information includes a plurality of pieces of information, the plurality of pieces of information may be transmitted together by the network device, or may be transmitted separately by the network device. In other words, the plurality of pieces of information may be transmitted by the network device by using one piece of signaling, or may be transmitted by the network device by using a plurality of pieces of signaling. This is not limited in this embodiment of this application. Optionally, when this application is applied to a joint transmission scenario, the configuration information may be transmitted by at least two network devices for joint transmission. For example, each network device transmits a part of information in the configuration information. Optionally, when this application is applied to a joint transmission scenario, the configuration information may alternatively be transmitted by one (for example, a serving network device or a coordinated network device) of at least two network devices for joint transmission. To be specific, the network device transmits the plurality of pieces of information in the configuration information. This is not limited in this embodiment of this application.

For example, the network device may use RRC information to instruct to transmit a signal 1 on the OFDM symbol 1, use DCI to instruct to transmit a signal 2 on the OFDM symbol 1, and use MAC information to instruct to transmit a signal 3 on the OFDM symbol 1.

Correspondingly, the terminal device determines, based on one or more of the RRC information, the DCI information, and the MAC information in the configuration information, that the network device instructs the terminal device to transmit the signal 1 to the signal 3 on the OFDM symbol 1. Further, the terminal device determines, based on the first information, an antenna panel for transmitting a signal and/or a signal that needs to be transmitted in the signal 1 to the signal 3.

It should be understood that, in this embodiment of this application, the signal that the network device configures the terminal device to transmit includes but is not limited to at least one of the following signals: a physical random access channel (physical random access channel, PRACH), a physical uplink control channel (physical uplink control channel, PUCCH), a physical uplink shared channel (physical uplink shared channel, PUSCH) (for example, information for carrying a beam training measurement result RSRP or the like, information such as channel state information CSI, or information such as a hybrid automatic repeat request HARQ), an SRS used for CSI measurement, and an SRS used for beam training or beam management.

It should also be understood that, when the present invention is applied to a single-point transmission scenario, the configuration information (for example, one or more pieces of signaling) may instruct the terminal device to simultaneously transmit the M signals to one network device; or when the present invention is applied to multi-point transmission (for example, a COMP scenario (such as NCJT transmission)), the configuration information (for example, one or more pieces of signaling) may instruct the terminal device to transmit the M signals to two or more network devices separately. This is not limited in this embodiment of this application.

It should be understood that, in this embodiment of this application, an antenna panel (panel) may also be referred to as an antenna set, a radio transceiver unit (transceiver unit TXRU) (or referred to as a radio transceiver module), an antenna unit, an antenna group, a horizontal antenna set, a vertical antenna set, an antenna array or element, an antenna port set, or the like. This is not limited in this embodiment of this application.

It should be understood that, in this embodiment of this application, the terminal device may have N antenna panels, where at least one antenna port may be configured on each antenna panel, and the at least one antenna port configured on each antenna panel may be referred to as an antenna port group.

In an optional implementation, one panel in this embodiment of this application can radiate one or more beams in different directions. In actual application, in one communication transmission process, one panel may radiate one beam in a particular direction. To be specific, one panel may correspond to one beam. Therefore, the N panels in this embodiment of this application may also be expressed as N beams. This is not limited in this embodiment of this application.

In this embodiment of this application, the first information may include one or more pieces of information. To be specific, in this embodiment of this application, the terminal device may determine, based on one or more pieces of information, an antenna panel for transmitting a signal and/or a signal that needs to be transmitted.

Optionally, as an example rather than a limitation, the first information may include at least one of the following three pieces of information:

(1) Priority of a Signal

It should be understood that, in this embodiment of this application, the priority of the signal may be indicated by the network device, or may be predefined by a protocol, or may be determined by the terminal device itself. This is not limited in this embodiment of this application.

Optionally, if the first information includes the priority of the signal, and the priority of the signal is indicated by the network device, the first information may include indication information of the priority of the signal, instead of the priority.

For example, when the first information includes the priority of the signal, the terminal device may preferentially determine, based on the priority of the signal, that a panel for transmitting a signal is an antenna panel for a high-priority signal, and/or determine that a signal that needs to be transmitted is a high-priority signal.

With reference to the first aspect, in an implementation of the first aspect, the priority of the signal satisfies at least one of the following conditions:

a signal to be transmitted by using fewer panels has a higher priority;

a priority of a signal on a physical random access channel PRACH is higher than a priority of a signal on a physical uplink control channel PUCCH, a priority of a signal on a PUCCH is higher than a priority of a signal on a physical uplink data channel PUSCH, or a priority of a signal on a PUSCH is higher than a priority of a sounding reference signal SRS;

a signal that occupies more resource blocks (Resource Block, RB) has a higher priority;

a signal to be transmitted by using a higher resource bandwidth has a higher priority;

a signal to be transmitted by using more data layers has a higher priority; and a priority of a signal on a time domain resource is higher than a priority of a signal on a subsequent time domain resource.

It should be understood that, the panel for transmitting a signal may be indicated by the network device, or may be determined by the terminal device itself. For example, the panel for transmitting a signal is determined by the terminal device based on a pre-measurement result, spatial relation information, path loss information, a priority of a panel, or a priority of a signal. This is not limited in this embodiment of this application.

Specifically, each condition for determining a priority of a signal may be separately used for determining the priority of the signal, or a plurality of conditions may be jointly used for determining the priority of the signal. For example, a sequence may be set for the plurality of conditions; and if the priority of the signal can be determined by using a former condition, the priority of the signal is determined based on the determining result; or if the priority of the signal cannot be determined by using a former condition, for example, if it is determined, based on the former condition, that priorities of two signals are the same, the priority of the signal is determined by using a latter condition, until priorities of different signals can be distinguished.

For example, a condition 1 is: a signal to be transmitted by using fewer panels has a higher priority; a condition 2 is: a priority of a signal on a physical random access channel PRACH is higher than a priority of a signal on a physical uplink control channel PUCCH, and/or a priority of a signal on a PUCCH is higher than a priority of a signal on a physical uplink data channel PUSCH, and/or a priority of a signal on a PUSCH is higher than a priority of a sounding reference signal SRS; a condition 3 is: a signal that occupies more resource blocks (Resource Block, RB) has a higher priority; a condition 4 is: a signal to be transmitted by using a higher resource bandwidth has a higher priority; a condition 5 is: a signal to be transmitted by using more data layers has a higher priority; and a condition 6 is: a priority of a signal on a time domain resource is higher than a priority of a signal on a subsequent time domain resource. In actual application, priorities of signals may be determined first based on the condition 1, and if the priorities of the signals are the same, the priorities of the signals are determined based on the condition 2, and so on, until priorities of different signals are determined. It should be understood that, although the foregoing provides a method for determining priorities of signals based on a sequence of the condition 1 to the condition 6, this embodiment of this application is not limited thereto. In actual application, the sequence of the six conditions may be changed. Alternatively, in actual application, only a part of the six conditions are used for determining priorities of signals. For example, priorities of signals are determined by using only the condition 1 and the condition 2. Further, a priority of the condition 2 may be higher than a priority of the condition 1. To be specific, the terminal device first determines the priorities of the signals based on the condition 2, and if the priorities of the signals are the same, the terminal device determines the priorities of the signals based on the condition 1. It should be understood that, only some conditions for determining priorities of signals are illustrated above. Optionally, in this embodiment of this application, priorities of signals may be further determined by using other conditions.

For example, a signal corresponding to a smaller cell index has a higher priority, or for signals of a same type, a signal whose resource index is smaller has a higher priority. This is not limited in this embodiment of this application.

(2) Priority of a Panel Corresponding to a Signal

It should be understood that, in this embodiment of this application, the priority of the panel corresponding to the signal may be indicated by the network device, or may be predefined by a protocol, or may be determined by the terminal device itself. This is not limited in this embodiment of this application.

For example, based on the priority of the panel corresponding to the signal, the terminal device determines that a panel for transmitting a signal is a high-priority antenna panel, and/or determines that a signal that needs to be transmitted is a signal corresponding to a high-priority panel.

With reference to the first aspect, in an implementation of the first aspect, the priority of the panel satisfies at least one of the following conditions:

better channel quality of a reference signal indicated by spatial relation information corresponding to a signal indicates a higher priority of a panel corresponding to the signal;

a lower path loss of a signal indicates a higher priority of a panel corresponding to the signal;

higher power of a signal indicates a higher priority of a panel corresponding to the signal; and a smaller index (index) of a panel indicates a higher priority of the panel.

Specifically, each condition for determining a priority of a panel may be separately used for determining the priority of the panel, or a plurality of conditions may be jointly used for determining the priority of the panel. For example, a sequence may be set for the plurality of conditions; and if the priority of the panel can be determined by using a former condition, the priority of the panel is determined based on the determining result; or if the priority of the panel cannot be determined by using a former condition, for example, if it is determined, based on the former condition, that priorities of two panels are the same, the priority of the panel is determined by using a latter condition, until priorities of different panels can be distinguished.

It should be understood that, in this embodiment of this application, power of a signal may be power for transmitting the signal, where the power for transmitting the signal is determined by the terminal device based on a power control parameter configured by the network device. This is not limited in this embodiment of this application.

(3) Spatial Relation Information or Path Loss Information Corresponding to a Signal For example, the terminal device determines, based on spatial relation information or path loss information corresponding to the signal, that a panel for transmitting a signal is an antenna panel corresponding to good channel quality, and/or determines that a signal that needs to be transmitted is a signal corresponding to good channel quality, where the channel quality is channel quality of a reference signal indicated by spatial relation information or path loss information corresponding to the signal.

It should be understood that, in this embodiment of this application, the spatial relation information corresponding to the signal may also be referred to as spatial relation information of the signal. The spatial relation information of the signal may be configured by the network device, and the terminal device transmits the signal based on the spatial relation information of the signal that is configured by the network device. To be specific, the terminal device determines, based on the spatial relation information, a transmit beam for the terminal device to transmit the signal. Optionally, the spatial relation information of the signal may alternatively be determined in a predefined manner, and the terminal device determines, based on the predefined spatial relation information of the signal, the transmit beam for the terminal device to transmit the signal.

With reference to the first aspect, in an implementation of the first aspect, a lower path loss of the signal indicates better channel quality of the reference signal.

It should be understood that, in actual application, the terminal device may determine, based on only one of the three pieces of information (1), (2), and (3), an antenna panel for transmitting a signal and/or a signal that needs to be transmitted, or may determine, based on two or more of the three pieces of information, an antenna panel for transmitting a signal and/or a signal that needs to be transmitted. For example, the terminal device may first determine, based on one piece of information, an antenna panel for transmitting a signal and/or a signal that needs to be transmitted; and if no result is determined, the terminal device may further determine, based on another piece of information, an antenna panel for transmitting a signal and/or a signal that needs to be transmitted, until the terminal device can determine a final antenna panel for transmitting a signal and/or a final signal that needs to be transmitted. For another example, a sequence of using the foregoing three pieces of information may exist. For example, the sequence of using the foregoing three pieces of information is: the first piece of information to the third piece of information. To be specific, the terminal device first uses the first piece of information to determine a signal to be transmitted; and if a final result is determined, the other two pieces of information are not considered; or if no final result is determined, the terminal device uses the other two pieces of information in sequence to determine an antenna panel for transmitting a signal and/or a signal that needs to be transmitted, until the terminal device can determine a final result.

It should also be understood that, in this embodiment of this application, the first information may further include other information. To be specific, the terminal device may further determine, based on the other information, an antenna panel for transmitting a signal and/or a signal that needs to be transmitted. This is not limited in this embodiment of this application.

For example, in actual application, at least one antenna panel for transmitting a signal by the terminal device may be determined by the terminal device based on the first information, or may not be determined based on the first information. This is not limited in this embodiment of this application. For example, the at least one antenna panel for transmitting a signal by the terminal device may be determined by the terminal device based on at least one of the following content:

indication information;
a pre-measurement result;
the spatial relation information or the path loss information;
the priority of the panel; and
the priority of the signal.

It should be understood that, the indication information may be information indicated by the network device. Herein the network device may explicitly indicate the panel or implicitly indicate the panel by using the indication information. This is not limited in this embodiment of this application.

For example, the network device may explicitly indicate a panel for transmitting a signal by the terminal device. Specifically, when the terminal device accesses the network device, the terminal device may report panel information of the terminal device, and the network device may explicitly indicate, by using signaling, a specific antenna panel for transmitting a signal by the terminal device. It should be understood that, herein the signaling indicating the antenna panel may be signaling same as or different from the signaling in the configuration information in step 210. This is not limited in this embodiment of this application. For another example, the network device explicitly indicates, by using spatial relation information, an antenna panel for transmitting a signal by the terminal device.

For another example, the network device may further implicitly indicate a panel for transmitting a signal by the terminal device. Specifically, the network device may implicitly indicate a panel by using a reference signal resource index or a reference signal resource set index. For example, the network device configures a corresponding reference signal (for example, a sounding reference signal SRS) resource set for each panel of the terminal device. For example, each antenna panel is associated with one or more reference signal resource sets. If a signal to be transmitted by the terminal device or a reference signal in spatial info for transmitting a signal by the terminal device belongs to a reference signal resource set S, it is considered that the terminal device uses a panel associated with the reference signal resource set S to transmit the signal.

It should also be understood that, herein the pre-measurement result is a pre-measurement result based on which the terminal device determines a panel for transmitting a signal. For example, the terminal device may determine, based on a result of beam training measurement, a panel having relatively good channel quality for transmitting a signal. For example, the terminal device may determine a panel for transmitting a signal based on a recent beam training measurement result.

With reference to specific examples, the following separately describes in detail specific solutions in which the terminal device transmits at least one of the M signals by using at least one of the N antenna panels in different cases in this embodiment of this application.

With reference to the first aspect, in an implementation of the first aspect, M is greater than or equal to 2, the first information includes priorities of signals, and the transmitting, by the terminal device, at least one of the M signals based on the first information by using at least one of the N antenna panels includes:

transmitting, by the terminal device based on priorities of the M signals by using at least one of the N antenna panels, at least one of the M signals that has a relatively high signal priority.

Therefore, in this embodiment of this application, preferentially transmitting a high-priority signal can ensure reliable transmission of the high-priority signal.

With reference to the first aspect, in an implementation of the first aspect, the first information includes a priority of a panel corresponding to the signal, and the transmitting, by the terminal device, at least one of the M signals based on the first information by using at least one of the N antenna panels includes:

transmitting, by the terminal device based on priorities of panels corresponding to the M signals by using at least one of the N antenna panels, at least one of the M signals that corresponds to a panel having a relatively high priority; or transmitting, by the terminal device, at least one of the M signals based on priorities of panels corresponding to the M signals by using at least one of the N antenna panels that has a relatively high priority; or transmitting, by the terminal device based on priorities of panels corresponding to the M signals by using at least one of the N antenna panels that has a relatively high priority, at least one of the M signals that corresponds to a panel having a relatively high priority.

Therefore, in this embodiment of this application, preferentially transmitting a signal of a high-priority panel can ensure reliable transmission of the signal of the high-priority panel.

With reference to the first aspect, in an implementation of the first aspect, the first information includes spatial relation information or path loss information corresponding to the signal, and the transmitting, by the terminal device, at least one of the M signals based on first information by using at least one of the N antenna panels includes:

transmitting, by the terminal device based on channel quality of reference signals indicated by spatial relation information or path loss information corresponding to the M signals by using at least one of the N antenna panels, at least one of the M signals that corresponds to relatively good channel quality; or transmitting, by the terminal device, at least one of the M signals based on channel quality of reference signals indicated by spatial relation information or path loss information corresponding to the M signals by using at least one of the N antenna panels that corresponds to relatively good channel quality; or transmitting, by the terminal device based on channel quality of reference signals indicated by spatial relation information or path loss information corresponding to the M signals by using at least one of the N antenna panels that corresponds to relatively good channel quality, at least one of the M signals that corresponds to relatively good channel quality.

Therefore, in this embodiment of this application, preferentially transmitting a signal having good channel quality can ensure reliable transmission of the signal.

With reference to the first aspect, in an implementation of the first aspect, the transmitting, by the terminal device based on priorities of the M signals by using at least one of the N antenna panels, at least one of the M signals that has a relatively high signal priority includes:

transmitting, by the terminal device based on the priorities of the M signals by using at least one of the N antenna panels, one of the M signals that has a highest signal priority; or based on the signal priorities corresponding to the M signals, transmitting, by the terminal device by using a first part of panels in the N antenna panels, a signal that has a highest signal priority, and transmitting, by using a second part of panels, a signal that has a second highest signal priority, where an intersection between the first part of panels and the second part of panels is empty, and the first part of panels and the second part of panels belong to the at least one panel.

Therefore, in this embodiment of this application, preferentially transmitting the signal having the highest priority can ensure reliable transmission of the high-priority signal. The terminal device further transmits other signals while transmitting the signal having the highest priority. Therefore, the terminal device can transmit as many signals as possible, and more service requirements can be satisfied.

With reference to the first aspect, in an implementation of the first aspect, the M signals include two signals whose priorities are the same and highest; and the two signals correspond to one or more same antenna panels, and the transmitting, by the terminal device based on priorities of the M signals by using at least one of the N antenna panels, at least one of the M signals that has a relatively high signal priority includes:

transmitting, by the terminal device by using the one or more antenna panels, one of the two signals that corresponds to a lower path loss or better channel quality of a reference signal indicated by spatial relation information; or a first signal in the two signals corresponds to a first antenna panel set, a second signal corresponds to a second antenna panel set, and the transmitting, by the terminal device based on priorities of the M signals by using at least one of the N antenna panels, at least one of the M signals that has a relatively high signal priority includes:

transmitting, by the terminal device, the first signal by using all or a part of panels in the first panel set, where a path loss corresponding to the first signal is lower or channel quality of a reference signal indicated by spatial relation information corresponding to the first signal is better; or transmitting, by the terminal device, the first signal by using all or a part of panels in the first panel set, and transmitting the second signal by using all or a part of panels in the second panel set other than the panels for transmitting the first signal, where a path loss corresponding to the first signal is lower or channel quality of a reference signal indicated by spatial relation information corresponding to the first signal is better; or the transmitting, by the terminal device based on priorities of the M signals by using at least one of the N antenna panels, at least one of the M signals that has a relatively high signal priority includes:

transmitting, by the terminal device by using all or a part of panels in the N antenna panels, one of the two signals that corresponds to a lower path loss or better channel quality; or transmitting, by the terminal device by using a third part of panels in the N antenna panels, one of the two signals that corresponds to a lower path loss or better channel quality of a reference signal indicated by spatial relation information, and transmitting the other signal by using a fourth part of panels in the N antenna panels. Optionally, an intersection between the third part of panels and the fourth part of panels may be empty.

Therefore, in this embodiment of this application, preferentially transmitting a signal having good channel quality can ensure reliable transmission of the signal. The terminal device further transmits other signals while transmitting the signal having the best channel quality. Therefore, the terminal device can transmit as many signals as possible, more service requirements can be satisfied, and uplink resource waste can be avoided.

With reference to the first aspect, in an implementation of the first aspect, when the terminal device transmits at least two of the M signals by using at least two of the N antenna panels, and a sum of configured power of the at least two signals is greater than maximum transmit power of the terminal device, one of the at least two signals is transmitted at the configured power, and the other signals are transmitted at residual power.

The signal transmitted at the configured power may be a signal that has a highest signal priority, or a signal that corresponds to a panel having a highest priority, or a signal that corresponds to best channel quality.

For example, the terminal device needs to transmit two signals: a signal 1 and a signal 2. Assuming that a sum of configured power P1 of the signal 1 and configured power P2 of the content 2 is greater than maximum transmit power Pmax of the terminal device, if a priority of the signal 1 is higher than a priority of the signal 2, the terminal devices uses the power P1 to transmits the signal 1 at the power P1, and transmits the signal 2 at power Pmax−P1.

Therefore, in this embodiment of this application, using the configured power to transmit the signal that has the highest priority, or the signal that corresponds to the panel having the highest priority, or the signal that corresponds to the best channel quality can ensure reliable transmission of the signal.

According to a second aspect, a data transmission signal is provided. The method includes:

transmitting, by a network device, configuration information, where the configuration information is used to configure a terminal device to transmit M signals in a first time unit, the terminal device has N antenna panels, M is an integer greater than or equal to 1, and N is an integer greater than or equal to 2; and receiving, by the network device, at least one of the M signals that is transmitted by the terminal device based on first information by using at least one of the N antenna panels.

Therefore, according to this embodiment of this application, the terminal device can select a panel based on the first information and select a signal that needs to be transmitted. This embodiment of this application provides a solution of determining a signal that needs to be transmitted, and can further resolve a problem that a panel cannot be selected to transmit a signal in the prior art.

It should be understood that, the second aspect corresponds to the first aspect. The second aspect may be performed by the network device interacting with the terminal device that performs the first aspect. For corresponding descriptions of the second aspect, refer to the descriptions in the first aspect. To avoid repetition, detailed descriptions are appropriately omitted herein.

Optionally, in an implementation of the second aspect, the first information includes at least one of the following information:

a priority of a signal;

a priority of a panel corresponding to a signal; and spatial relation information or path loss information corresponding to a signal.

Optionally, in an implementation of the second aspect, the priority of the signal satisfies at least one of the following conditions:

a signal to be transmitted by using fewer panels has a higher priority;

a priority of a signal on a physical random access channel PRACH is higher than a priority of a signal on a physical uplink control channel PUCCH, a priority of a signal on a PUCCH is higher than a priority of a signal on a physical uplink data channel PUSCH, or a priority of a signal on a PUSCH is higher than a priority of a sounding reference signal SRS;

a signal that occupies more resource blocks RBs has a higher priority;

a signal to be transmitted by using a higher resource bandwidth has a higher priority;

a signal to be transmitted by using more data layers has a higher priority; and a priority of a signal on a time domain resource is higher than a priority of a signal on a subsequent time domain resource.

Optionally, in an implementation of the second aspect, the priority of the panel satisfies at least one of the following conditions:

better channel quality of a reference signal indicated by spatial relation information corresponding to a signal indicates a higher priority of a panel corresponding to the signal;

a lower path loss of a signal indicates a higher priority of a panel corresponding to the signal;

higher power of a signal indicates a higher priority of a panel corresponding to the signal; and a smaller index of a panel indicates a higher priority of the panel.

According to a third aspect, a communications apparatus is provided and includes each module or unit configured to perform the method in the first aspect or any possible implementation of the first aspect.

In an implementation, the communications apparatus is a terminal device.

According to a fourth aspect, a communications apparatus is provided and includes each module or unit configured to perform the method in the second aspect or any possible implementation of the second aspect.

In an implementation, the communications apparatus is a network-side device.

According to a fifth aspect, a communications apparatus is provided and includes a transceiver, a processor, and a memory. The processor is configured to control the transceiver to transmit or receive a signal; the memory is configured to store a computer program; and the processor is configured to invoke and run the computer program in the memory, so that the network device performs the method in the first aspect and the possible implementations of the first aspect.

In an implementation, the communications apparatus is a terminal device.

According to a sixth aspect, a communications apparatus is provided and includes a transceiver, a processor, and a memory. The processor is configured to control the transceiver to transmit or receive a signal; the memory is configured to store a computer program; and the processor is configured to invoke and run the computer program in the memory, so that the terminal device performs the method in the second aspect and the possible implementations of the second aspect.

In an implementation, the communications apparatus is a network-side device.

According to a seventh aspect, a computer-readable medium is provided. The computer-readable medium stores a computer program, and when the computer program is executed by a computer, the method in the first aspect and the possible implementations of the first aspect is implemented.

According to an eighth aspect, a computer-readable medium is provided. The computer-readable medium stores a computer program, and when the computer program is executed by a computer, the method in the second aspect and the possible implementations of the second aspect is implemented.

According to a ninth aspect, a computer program product is provided. When the computer program product is executed by a computer, the method in the first aspect and the possible implementations of the first aspect is implemented.

According to a tenth aspect, a computer program product is provided. When the computer program product is executed by a computer, the method in the second aspect and the possible implementations of the second aspect is implemented.

According to an eleventh aspect, a processing apparatus is provided and includes a processor and an interface.

According to a twelfth aspect, a processing apparatus is provided and includes a processor, an interface, and a memory.

In the eleventh aspect or the twelfth aspect, the processor is configured to perform the methods in the first aspect and the second aspect or any possible implementation of the first aspect and the second aspect, where a related data exchange process (for example, transmitting or receiving data transmission) is completed by using the foregoing interface. In a specific implementation process, the interface may further complete the data exchange process by using a transceiver.

It should be understood that, the processing apparatus in the eleventh aspect or the twelfth aspect may be a chip. The processor may be implemented by hardware or software. When being implemented by hardware, the processor may be a logic circuit, an integrated circuit, or the like. When being implemented by software, the processor may be a general purpose processor, and is implemented by reading software code stored in the memory, where the memory may be integrated in the processor, or may be located outside the processor and exists independently.

According to a thirteenth aspect, a system is provided and includes the foregoing network device and terminal device.

DESCRIPTION OF EMBODIMENTS

The following describes technical solutions of this application with reference to the accompanying drawings.

Embodiments of this application may be applied to various communications systems. Therefore, the following descriptions are not limited to a specific communications system. For example, the embodiments of this application may be applied to a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communications system, a future 5th generation (5th generation, 5G) system, or a new radio (new radio, NR) system.

Figure 1:
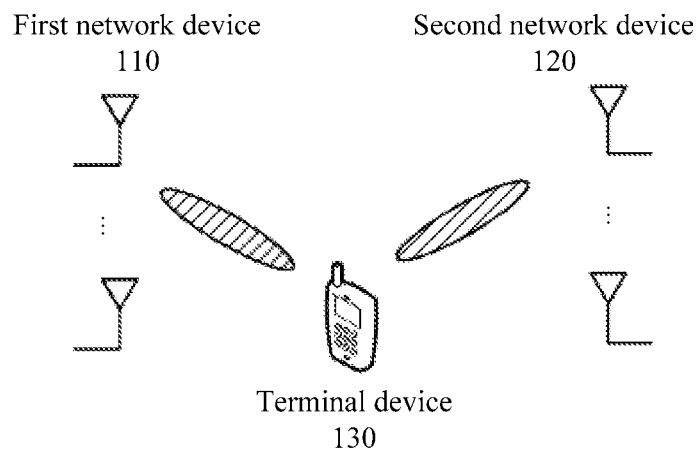
FIG. 1 is a schematic diagram of an application scenario according to an embodiment of this application.

FIG. 1 is a schematic block diagram of a wireless communications system 100 applicable to an embodiment of this application. The wireless communications system 100 may include a first network device 110, a second network device 120, and one or more terminal devices 130 within coverage of the first network device 110 and the second network device 120. The terminal device 130 may be mobile or fixed. The first network device 110 and the second network device 120 may both communicate with the terminal device 130 by using a radio air interface. The first network device 110 and the second network device 120 may provide communication coverage for a specific geographical area, and may communicate with a terminal device within the coverage area.

It should be understood that, terms such as "first" and "second" in this embodiment of this application are intended for distinguishing only, and shall not be construed as a limitation on this embodiment of this application.

It should be understood that, in actual application, the first network device 110 and the second network device 120 may communicate with the terminal device 130 simultaneously. This case corresponds to a joint transmission scenario. The joint transmission scenario may be a joint transmission scenario in a homogeneous network, or may be a joint transmission scenario in a heterogeneous network. This is not limited in this embodiment of this application.

Optionally, in actual application, alternatively only one network device may communicate with the terminal device. For example, the first network device or the second network device communicates with the terminal device. This case corresponds to a single-site transmission scenario.

It should be understood that, the first network device 110 or the second network device 120 in this embodiment of this application may be a base transceiver station (base transceiver station, BTS) in a global system for mobile communications (global system for mobile communications, GSM) or code division multiple access (code division multiple access, CDMA), or may be a NodeB (NodeB, NB) in a wideband code division multiple access (wideband code division multiple access, WCDMA) system, or may be an evolved NodeB (evolved NodeB, eNB or eNodeB) in an LTE system, or may be a radio controller in a cloud radio access network (cloud radio access network, CRAN) scenario; or the network device may be a relay station, an access point, a vehicle-mounted device, a wearable device, a network device in a future 5G network, a network device in a future evolved PLMN network, or the like, for example, a transmission point (TRP or TP) in an NR system, a gNB (gNB) in an NR system, or one antenna panel or one group of antenna panels (including a plurality of antenna panels) of a gNB in a 5G system. This is not limited in this embodiment of this application.

The terminal device 130 may also be referred to as user equipment (User Equipment, UE), an access terminal, a subscriber unit, a subscriber station, a mobile station, a mobile station, a remote station, a remote terminal, a mobile device, a user terminal, a terminal, a wireless communications device, a user agent, a user apparatus, or the like. The access terminal may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, an unmanned aerial vehicle, a terminal device in a future 5G network, a terminal device in a future evolved public land mobile network (public land mobile network, PLMN), or the like. This is not limited in this embodiment of this application.

The wireless communications system 100 may support coordinated multipoint transmission (coordinated multiple points transmission/reception, CoMP) transmission. To be specific, at least two network devices (transmission points) transmit downlink data to the terminal device in a coordinated multipoint transmission manner. In other words, the terminal device 130 may communicate with both the first network device 110 and the second network device 120 over a same carrier. The coordinated multipoint transmission manner may be implemented by using a technology such as space diversity and/or spatial multiplexing. This is not limited in this application.

The wireless communications system 100 may also support a single-site transmission scenario. To be specific, one site communicates with the terminal device.

"Coordinated multipoint transmission" in this application includes but is not limited to joint transmission JT. JT includes coherent JT and non-coherent JT (NCJT). A difference between coherent JT and NCJT lies in that NCJT is to perform beamforming on different MIMO data streams from a plurality of coordinated TPs separately, but coherent JT is to perform joint beamforming on all MIMO data streams from a plurality of coordinated TPs.

In this embodiment of this application, the first network device may be a serving network device, and the second network device may be a coordinated network device; or the first network device may be a coordinated network device, and the second network device is a serving network device.

When this application is applied to a coordinated multi-point transmission scenario, the serving network device may transmit control signaling to the terminal device, and the coordinated network device may transmit data to the terminal device; or the serving network device may transmit control signaling to the terminal device, and both the serving network device and the coordinated network device may transmit data to the terminal device; or both the serving network device and the coordinated network device may transmit control signaling to the terminal device, and both the serving network device and the coordinated network device may transmit data to the terminal device. This is not limited in this embodiment of this application. Communication, for example, control message transfer, may be performed between the serving network device and the coordinated network device, and between a plurality of coordinated network devices.

For example, the first network device is a serving network device, and the second network device is a coordinated network device. There may be one or more second network devices. In addition, the second network device and the first network device are network devices satisfying different quasi-co-locations (Quasi-Co-Location, QCL). It should be understood that, alternatively, both the first network device and the second network device may be serving network devices. This is not limited in this embodiment of this application.

When this application is applied to the foregoing single-site transmission scenario or joint transmission scenario, when one transmission point or two transmission points instruct the terminal device to simultaneously transmit a plurality of signals, if the plurality of signals collide, for example, when transmit beams corresponding to the plurality of signals are different or panels corresponding to the plurality of signals are different, the terminal device cannot determine which signal is to be transmitted and/or cannot determine which panel is to be used to transmit a signal. Therefore, network performance is affected.

In view of the foregoing problem, an embodiment of this application provides a signal transmission method. According to the method, a terminal device can select a panel based on first information and select a signal that needs to be transmitted. Therefore, a solution of determining a signal that needs to be transmitted is provided, and further, a problem in the prior art can be resolved.

For ease of understanding and description, as an example rather than a limitation, the following describes an execution process and actions of a signal transmission method in a communications system in this application.

It should be understood that, quasi-co-location (Quasi-Co-Location, QCL) information in this embodiment of this application may also be referred to as co-location assumption information. The QCL information may be used to help describe receive-end beamforming information of the terminal device and a receiving procedure. In an optional implementation, a network device side may indicate that a demodulation reference signal for a PDCCH or a PDSCH and one or more of a plurality of reference signal resources previously reported by the terminal device satisfy a QCL relationship. For example, the reference signal may be a channel state information reference signal (channel state information reference signal, CSI-RS). Herein each reported CSI-RS resource index corresponds to one transmit-receive beam pair that is previously established during measurement based on the CSI-RS resource. It should be understood that, receive beam information of two reference signals or channels satisfying a QCL relationship is the same. Therefore, based on the reference signal resource index, the terminal device may infer receive beam information for receiving the PDCCH or the PDSCH.

Optionally, the QCL information may also include some spatial feature parameters, for example, an angle of arrival AoA (angle of arrival), a dominant angle of arrival dominant AoA, an average angle of arrival, a power angular spectrum of the angle of arrival (power angular spectrum (PAS) of AoA), an angle of departure AoD (angle of departure), a dominant angle of departure, an average angle of departure, a power angular spectrum of the angle of departure, terminal transmit beamforming, terminal receive beamforming, a spatial channel correlation, base station transmit beamforming, base station receive beamforming, an average channel gain, an average channel delay, delay spread delay spread, Doppler spread Doppler spread, and spatial receiving parameters (spatial Rx parameters). The spatial feature parameters describe spatial channel features between an antenna port of a first reference signal and an antenna port of a second reference signal, and help the terminal device complete a process of receive-end beamforming and reception processing based on the QCL information.

Spatial relation (Spatial Relation) information is used to help describe transmit-end beamforming information of the terminal device and a transmission procedure. The spatial relation information is used to indicate a spatial receiving parameter relationship between two reference signals, where a target reference signal may be generally a demodulation reference signal (demodulation reference signal, DMRS), a sounding reference signal (sounding reference signal, SRS), or the like, but a cited reference signal or source reference signal may be generally a channel state information reference signal (channel state information reference signal, CSI-RS), a sounding reference signal (SRS), a synchronization signal and physical broadcast channel block (synchronous signal/PBCH block, SSB), or the like. It should be understood that, spatial feature parameters of two reference signals or channels satisfying spatial correlation information are the same. Therefore, a spatial feature parameter of the target reference signal may be inferred based on a resource index of the source reference signal.

The spatial feature parameters describe spatial channel features between an antenna port of the source reference signal and an antenna port of the target reference signal, and help the terminal device complete a process of transmit-end beamforming or transmission processing based on the spatial relation information. It should be understood that, the terminal may transmit the target reference signal based on transmit beam information of the source reference signal indicated by the spatial relation information.

Optionally, a beam in this embodiment of this application may correspond to a spatial filter in a standard, where a transmit beam corresponds to a spatial transmit filter, and a receive beam may correspond to a spatial receive filter. The beam is a communication resource. The beam may be a wide beam, or a narrow beam, or a beam of another type. A technology for forming a beam may be a beamforming technology or another technical means. The beamforming technology may be specifically a digital beamforming technology, an analog beamforming technology, or a hybrid digital/analog beamforming technology. Different beams may be considered as different resources. Same information or different information may be transmitted by using different beams. Optionally, a plurality of beams having same or similar communication features may be considered as one beam. A beam may include one or more antenna ports for transmitting a data channel, a control channel, a sounding signal, or the like. For example, the transmit beam may indicate distribution of signal strength of a signal transmitted by an antenna, formed in different spatial directions, and the receive beam may indicate distribution of signal strength of a radio signal received from an antenna, in different spatial directions. It may be understood that, one or more antenna ports forming one beam may also be considered as one antenna port set.

Beams may be classified into a transmit beam and a receive beam of the network device, and a transmit beam and a receive beam of the terminal device. The transmit beam of the network device is used to describe transmit-end beamforming information of the network device, and the receive beam of the network device is used to describe receive-end beamforming information of the network device. The transmit beam of the terminal device is used to describe transmit-end beamforming information of the terminal device, and the receive beam of the terminal device is used to describe receive-end beamforming information of the terminal device. To be specific, a beam is used to describe beamforming information. The beam may correspond to a time resource and/or a spatial resource and/or a frequency domain resource. Optionally, the beam may further correspond to a reference signal resource (for example, a reference signal resource for beamforming) or beamforming information. Optionally, the beam may further correspond to information associated with a reference signal resource, where a reference signal may be a CSI-RS, an SSB, a DMRS, a phase tracking reference signal (phase tracking reference signal, PTRS), a tracking reference signal (tracking reference signal or CSI-RS for tracking, TRS), an SRS, or the like. Optionally, the TRS may also be referred to as a time-frequency tracking reference signal, and the TRS is a reference signal used for fine time and frequency synchronization. The information associated with the reference signal resource may be an identifier of the reference signal resource, or QCL information (especially QCL of a type D), spatial relation information, or the like. The identifier of the reference signal resource corresponds to a transmit-receive beam pair that is previously established during measurement based on the reference signal resource. The terminal may infer beam information by using the reference signal resource index.

Optionally, the beam may further correspond to a spatial domain filter (spatial filter, spatial domain filter), or a spatial domain transmission filter (spatial domain transmission filter).

It should be understood that, in this embodiment of this application, the terminal device or the network device includes a hardware layer and an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more of computer operating systems that implement service processing by using a process (process), such as a Linux operating system, a UNIX operating system, an Android operating system, an iOS operating system, or a Windows operating system. The application layer includes applications such as a browser, contacts, word processing software, and instant messaging software. In addition, a specific structure of an entity for performing a method provided in an embodiment of this application is not particularly limited in this embodiment of this application, provided that a program recording code of the method provided in this embodiment of this application can be run to implement communication according to the method provided in this embodiment of this application. For example, an entity for performing a method provided in an embodiment of this application may be a terminal device or a network device, or may be a function module capable of invoking and executing a program in a terminal device or a network device.

In addition, aspects or features of this application may be implemented as a method, an apparatus or a product that uses standard programming and/or engineering technologies. The term "product" used in this application may cover a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (compact disc, CD), a digital versatile disc (digital versatile disc, DVD), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain, and/or carry an instruction and/or data.

It should also be understood that, the scenario shown in FIG. 1 may be a low-frequency scenario, or may be a high-frequency scenario. This is not limited in this embodiment of this application.

It should be noted that, some names and English abbreviations or acronyms in this specification are used for descriptions of the embodiments of this application by using an LTE system as an example. However, the embodiments of this application are not limited thereto. The names and English abbreviations or acronyms may change with evolution of a network. For specific evolution, refer to descriptions in a corresponding standard. For example, refer to corresponding descriptions in 5G.

Figure 2:
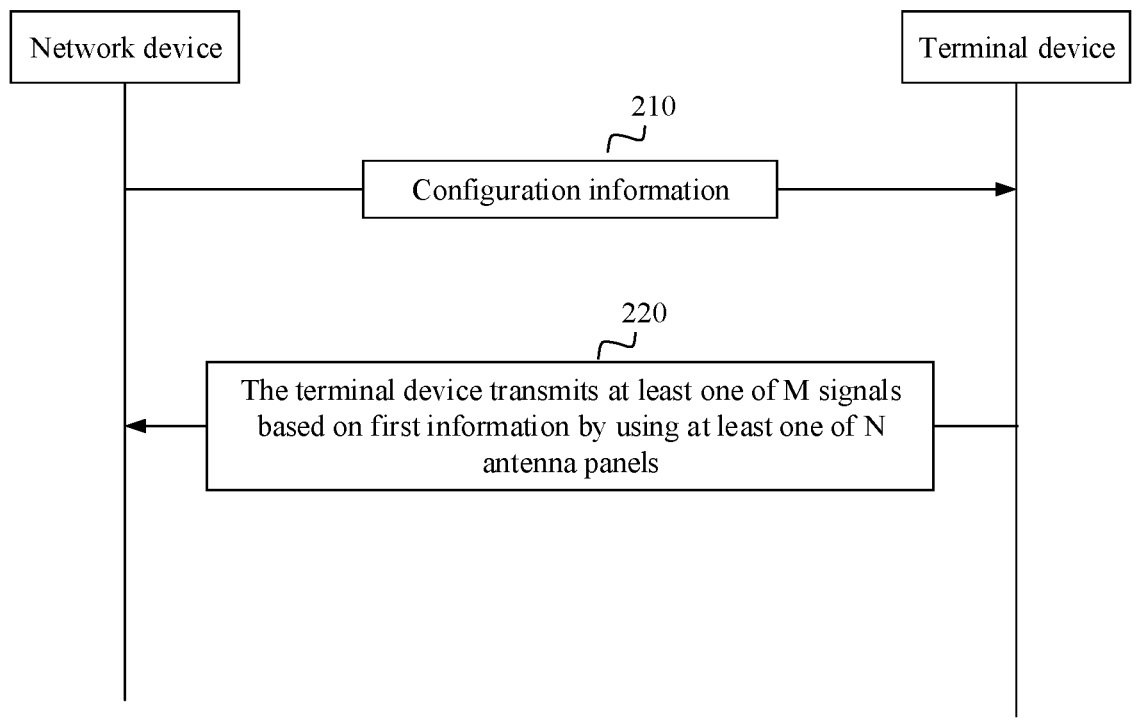
FIG. 2 is a schematic flowchart of a communication method according to an embodiment of this application.

FIG. 2 is a schematic flowchart of a method 200 according to an embodiment of this application. The method shown in FIG. 2 may be applied to a communications system supporting CoMP shown in FIG. 1 or a single-site communications system. The method 200 shown in FIG. 2 includes the following steps.

210. A network device transmits configuration information to a terminal device.

The configuration information is used to configure the terminal device to transmit M signals in a first time unit.

Correspondingly, the terminal device receives the configuration information, and determines, based on the configuration information, that the M signals need to be transmitted in the first time unit. The terminal device has N antenna panels. M is an integer greater than or equal to 1, and N is an integer greater than or equal to 2.

It should be understood that, in this embodiment of this application, the first time unit may be a period of time. For example, the first time unit may be one or more orthogonal frequency division multiplexing (orthogonal frequency division multiplexing, OFDM) symbols, one or more slots, or one or more subframes. This is not limited in this embodiment of this application.

Optionally, in this embodiment of this application, the M signals may completely overlap in time, or the M signals partly overlap in time. This is not limited in this embodiment of this application.

That the M signals completely overlap in time may indicate that time of transmitting all of the M signals configured by the network device is the same. For example, all the signals are transmitted on an OFDM symbol 1. That the M signals partly overlap in time may indicate that time of transmitting signals in the M signals configured by the network device does not completely overlap. For example, in the M signals configured by the network device, a first signal is transmitted on the OFDM symbol 1 to an OFDM symbol 3, a second signal is transmitted on the OFDM symbol 1 to an OFDM symbol 2, and a third signal is transmitted on the OFDM symbol 2 to the OFDM symbol 3. In this case, the first signal to the third signal partly overlap in time, that is, overlap on the OFDM symbol 2.

It should be understood that, in this embodiment of this application, the configuration information may include one piece of information or may include a plurality of pieces of information. For example, the configuration information may include at least one of radio resource control (radio resource control, RRC) information, medium access control (medium access control, MAC) information, or downlink control information (downlink control information, DCI).

When the configuration information includes a plurality of pieces of information, the plurality of pieces of information may be transmitted together by the network device, or may be transmitted separately by the network device. In other words, the plurality of pieces of information may be transmitted by the network device by using one piece of signaling, or may be transmitted by the network device by using a plurality of pieces of signaling. This is not limited in this embodiment of this application. Optionally, when this application is applied to a joint transmission scenario, the configuration information may be transmitted by at least two network devices for joint transmission. For example, each network device transmits a part of information in the configuration information. Optionally, when this application is applied to a joint transmission scenario, the configuration information may alternatively be transmitted by one (for example, a serving network device or a coordinated network device) of at least two network devices for joint transmission. To be specific, the network device transmits the plurality of pieces of information in the configuration information. This is not limited in this embodiment of this application.

For example, the network device may use RRC information to instruct to transmit a signal 1 on the OFDM symbol 1, use DCI to instruct to transmit a signal 2 on the OFDM symbol 1, and use MAC information to instruct to transmit a signal 3 on the OFDM symbol 1.

Correspondingly, the terminal device determines, based on one or more of the RRC information, the DCI information, and the MAC information in the configuration information, that the network device instructs the terminal device to transmit the signal 1 to the signal 3 on the OFDM symbol 1. Further, the terminal device determines, based on first information, an antenna panel for transmitting a signal and/or a signal that needs to be transmitted in the signal 1 to the signal 3.

It should be understood that, in this embodiment of this application, the signal that the network device configures the terminal device to transmit includes but is not limited to at least one of the following signals: a physical random access channel (physical random access channel, PRACH), a physical uplink control channel (physical uplink control channel, PUCCH), a physical uplink shared channel (physical uplink shared channel, PUSCH) (for example, information for carrying a beam training measurement result RSRP or the like, information such as channel state information CSI, or information such as a hybrid automatic repeat request HARQ), an SRS used for CSI measurement, and an SRS used for beam training or beam management.

It should be understood that, when the signal is a channel, it indicates that the signal that the network device configures the terminal device to transmit is data or a signal carried by the channel. For ease of description, the signal is directly described as the channel in this embodiment of this application.

It should also be understood that, when the present invention is applied to a single-point transmission scenario, the configuration information (for example, one or more pieces of signaling) may instruct the terminal device to simultaneously transmit the M signals to one network device; or when the present invention is applied to multi-point transmission (for example, a COMP scenario (such as NCJT transmission)), the configuration information (for example, one or more pieces of signaling) may instruct the terminal device to transmit the M signals to two or more network devices separately. This is not limited in this embodiment of this application.

It should be understood that, in this embodiment of this application, an antenna panel (panel) may also be referred to as an antenna set, a radio transceiver unit (transceiver unit TXRU) (or referred to as a radio transceiver module), an antenna unit, an antenna group, a horizontal antenna set, a vertical antenna set, an antenna array or element, an antenna port set, or the like. This is not limited in this embodiment of this application.

It should be understood that, in this embodiment of this application, the terminal device may have N antenna panels, where at least one antenna port may be configured on each antenna panel, and the at least one antenna port configured on each antenna panel may be referred to as an antenna port group.

Figure 3:
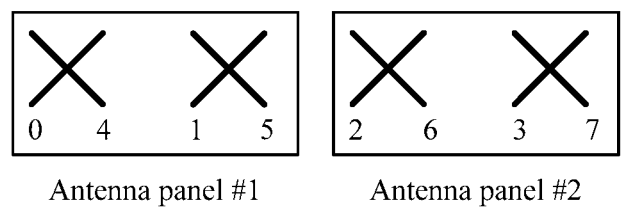
FIG. 3 is a schematic block diagram of an antenna panel according to an embodiment of this application.

As an example rather than a limitation, the following describes an example of an optional antenna panel in an embodiment of this application with reference to FIG. 3. FIG. 3 is a schematic diagram in which a plurality of antenna ports are configured on a plurality of antenna panels. Specifically, FIG. 3 is a schematic diagram of two antenna panels on which a plurality of antenna ports are configured. Four antenna ports are configured on each antenna panel. Each X in the figure represents two antenna ports in different polarization directions. Four antenna ports are configured on each antenna panel in the figure. On an antenna panel #1, an antenna port 0 and an antenna port 1 are antenna ports in a same polarization direction, and correspond to a same beam vector (or referred to as a precoding vector), for example, denoted as $b_1$; and an antenna port 4 and an antenna port 5 are antenna ports in a same polarization direction, and correspond to another same beam vector, for example, denoted as $b_2$. Similarly, on an antenna panel #2, an antenna port 2 and an antenna port 3 correspond to the beam vector $b_1$, and an antenna port 6 and an antenna port 7 correspond to the beam vector $b_2$, where $b_1$ and $b_2$ may be two orthogonal discrete Fourier transform (discrete Fourier transform, DFT) vectors, or may be mathematical vectors representing spatial electromagnetic wave features. This is not particularly limited in this embodiment of this application.

It should be noted that, for ease of understanding, a case in which a plurality of antenna ports are configured on a plurality of antenna panels is described above with reference to FIG. 3. However, a correspondence between an antenna and an antenna port is not limited in this embodiment of this application, and one or more physical antennas may be configured as one antenna port. In other words, the antenna port may be understood as a transmit antenna recognized by a receive-end device, or a transmit antenna that can be distinguished in space. Because one antenna port is configured for each virtual antenna, each virtual antenna may be a weighted combination of a plurality of physical antennas, and each antenna port corresponds to one reference signal.

In an optional implementation, one panel in this embodiment of this application can radiate one or more beams in different directions. In actual application, in one communication transmission process, one panel may radiate one beam in a particular direction. To be specific, one panel may correspond to one beam. Therefore, the N panels in this embodiment of this application may also be expressed as N beams. This is not limited in this embodiment of this application.

It should be understood that, for ease of description, sometimes an antenna panel is described as a panel in this specification, that is, the panel is equivalent to the antenna panel in this specification.

220. The terminal device transmits at least one of the M signals based on the first information by using at least one of the N antenna panels.

It should be understood that in this embodiment of this application, the terminal device may determine at least one antenna panel and/or at least one signal based on the first information. To be specific, in this embodiment of this application, the terminal device may transmit a part or all of the M signals by using all or a part of the N antenna panels.

Therefore, according to this embodiment of this application, the terminal device can select a panel based on the first information and select a signal that needs to be transmitted. This embodiment of this application provides a solution of determining a signal that needs to be transmitted, and can further resolve a problem that a panel cannot be selected to transmit a signal in the prior art.

Optionally, when the terminal device transmits a signal by using a part of the N antenna panels, the terminal device does not transmit the signal on remaining panels; or optionally, that the terminal device transmits a signal by using a part of the N antenna panels may be considered as transmitting the signal by using all panels, and in this case, power for transmitting the signal on this part of panels is greater than 0, and power for transmitting the signal on remaining panels is 0.

It should be understood that, in this embodiment of this application, the first information may be all or a part of information in the configuration information, or the first information may be information different from the configuration information. This is not limited in this embodiment of this application.

In this embodiment of this application, the first information may include one or more pieces of information. To be specific, in this embodiment of this application, the terminal device may determine, based on one or more pieces of information, an antenna panel for transmitting a signal and/or a signal that needs to be transmitted.

Optionally, as an example rather than a limitation, the first information may include at least one of the following three pieces of information:

(1) Priority of a Signal

It should be understood that, in this embodiment of this application, the priority of the signal may be indicated by the network device, or may be predefined by a protocol, or may be determined by the terminal device itself. This is not limited in this embodiment of this application. Optionally, if the first information includes the priority of the signal, and the priority of the signal is indicated by the network device, the first information may include indication information of the priority of the signal, instead of the priority.

For example, when the first information includes the priority of the signal, the terminal device may preferentially determine, based on the priority of the signal, that a panel for transmitting a signal is an antenna panel for a high-priority signal, and/or determine that a signal that needs to be transmitted is a high-priority signal.

In this embodiment of this application, the priority of the signal satisfies at least one of the following conditions:

a signal to be transmitted by using fewer panels has a higher priority;

a priority of a signal on a physical random access channel PRACH is higher than a priority of a signal on a physical uplink control channel PUCCH, and/or a priority of a signal on a PUCCH is higher than a priority of a signal on a physical uplink data channel PUSCH, and/or a priority of a signal on a PUSCH is higher than a priority of a sounding reference signal SRS;

a signal that occupies more resource blocks (Resource Block, RB) has a higher priority;

a signal to be transmitted by using a higher resource bandwidth has a higher priority;

a signal to be transmitted by using more data layers has a higher priority; and a priority of a signal on a time domain resource is higher than a priority of a signal on a subsequent time domain resource.

It should be understood that, the panel for transmitting a signal may be indicated by the network device, or may be determined by the terminal device itself. For example, the panel for transmitting a signal is determined by the terminal device based on a pre-measurement result, spatial relation information, path loss information, a priority of a panel, or a priority of a signal. This is not limited in this embodiment of this application.

Specifically, each condition for determining a priority of a signal may be separately used for determining the priority of the signal, or a plurality of conditions may be jointly used for determining the priority of the signal. For example, a sequence may be set for the plurality of conditions; and if the priority of the signal can be determined by using a former condition, the priority of the signal is determined based on the determining result; or if the priority of the signal cannot be determined by using a former condition, for example, if it is determined, based on the former condition, that priorities of two signals are the same, the priority of the signal is determined by using a latter condition, until priorities of different signals can be distinguished.

For example, a condition 1 is: a signal to be transmitted by using fewer panels has a higher priority; a condition 2 is: a priority of a signal on a physical random access channel PRACH is higher than a priority of a signal on a physical uplink control channel PUCCH, and/or a priority of a signal on a PUCCH is higher than a priority of a signal on a physical uplink data channel PUSCH, and/or a priority of a signal on a PUSCH is higher than a priority of a sounding reference signal SRS; a condition 3 is: a signal that occupies more resource blocks (Resource Block, RB) has a higher priority; a condition 4 is: a signal to be transmitted by using a higher resource bandwidth has a higher priority; a condition 5 is: a signal to be transmitted by using more data layers has a higher priority; and a condition 6 is: a priority of a signal on a time domain resource is higher than a priority of a signal on a subsequent time domain resource. In actual application, priorities of signals may be determined first based on the condition 1, and if the priorities of the signals are the same, the priorities of the signals are determined based on the condition 2, and so on, until priorities of different signals are determined. It should be understood that, although the foregoing provides a method for determining priorities of signals based on a sequence of the condition 1 to the condition 6, this embodiment of this application is not limited thereto. In actual application, the sequence of the six conditions may be changed. Alternatively, in actual application, only a part of the six conditions are used for determining priorities of signals. For example, priorities of signals are determined by using only the condition 1 and the condition 2. Further, a priority of the condition 2 may be higher than a priority of the condition 1. To be specific, the terminal device first determines the priorities of the signals based on the condition 2, and if the priorities of the signals are the same, the terminal device determines the priorities of the signals based on the condition 1.

It should be understood that, only some conditions for determining priorities of signals are illustrated above. Optionally, in this embodiment of this application, priorities of signals may be further determined by using other conditions.

For example, a signal corresponding to a smaller cell index has a higher priority, or for signals of a same type, a signal whose resource index is smaller has a higher priority. This is not limited in this embodiment of this application.

(2) Priority of a Panel Corresponding to a Signal

It should be understood that, in this embodiment of this application, the priority of the panel corresponding to the signal may be indicated by the network device, or may be predefined by a protocol, or may be determined by the terminal device itself. This is not limited in this embodiment of this application.

For example, the priority of the panel may be classified into a level 1, a level 2, a level 3, a level 4, . . . , where panel priorities from the level 1 to the level 4 decrease successively. The network device may directly indicate a priority of a panel corresponding to a signal. For example, the network device configures the terminal device to transmit three signals, and indicates that a priority of a panel corresponding to a signal 1 is the level 1, and that a priority of a panel corresponding to a signal 2 is the level 4, and that a priority of a panel corresponding to a signal 3 is the level 2.

For another example, a priority of a panel corresponding to a signal is predefined by a protocol, that is, a priority of each panel may be predefined in the protocol.

For another example, alternatively, the terminal device itself may determine a priority of a panel corresponding to a signal. For example, the terminal device determines, based on a pre-measurement result, spatial relation information, path loss information, or the like, a priority of a panel corresponding to a signal. For example, if a path loss corresponding to a signal is lower, the terminal device may determine that a panel corresponding to the signal has a higher priority. For another example, a correspondence exists between the pre-measurement result and a priority of a panel, and the terminal device may determine, based on the pre-measurement result, the priority of the panel corresponding to the measurement result.

Specifically, based on the priority of the panel corresponding to the signal, the terminal device may determine that a panel for transmitting a signal is a high-priority antenna panel, and/or determine that a signal that needs to be transmitted is a signal corresponding to a high-priority panel.

Optionally, the priority of the panel satisfies at least one of the following conditions:

better channel quality of a reference signal indicated by spatial relation information corresponding to a signal indicates a higher priority of a panel corresponding to the signal;

a lower path loss of a signal indicates a higher priority of a panel corresponding to the signal;

higher power of a signal indicates a higher priority of a panel corresponding to the signal; and a smaller index (index) of a panel indicates a higher priority of the panel is higher.

As an example rather than a limitation, in this embodiment of this application, a path loss level may be set, where a correspondence may exist between the path loss level and a priority. For example, a lower path loss of a signal indicates a lower path loss level, and correspondingly, a panel corresponding to the signal has a higher priority.

As an example rather than a limitation, in this embodiment of this application, a power level may be set, where a correspondence may exist between the power level and a priority. For example, higher power of a signal indicates a higher power level, and correspondingly, a panel corresponding to the signal has a higher priority.

Similarly, a priority of a panel corresponding to a signal may be further determined in a similar manner in this embodiment of this application. Details are not described in this embodiment of this application.

Similarly, a priority of a signal may be further determined in a similar manner in this embodiment of this application. For example, as an example rather than a limitation, in this embodiment of this application, a panel quantity level may be set, where a correspondence may exist between the panel quantity level and a priority of a signal. For example, a smaller quantity of panels for transmitting a signal indicates a higher panel quantity level, and correspondingly, the signal has a higher priority.

As an example rather than a limitation, in this embodiment of this application, a resource bandwidth level may be set, where a correspondence may exist between the bandwidth level and a priority. For example, a higher resource bandwidth for transmitting a signal indicates a higher bandwidth level, and correspondingly, the signal has a higher priority.

Similarly, a priority of a signal may be further determined in a similar manner in this embodiment of this application. Details are not described in this embodiment of this application.

Specifically, each condition for determining a priority of a panel may be separately used for determining the priority of the panel, or a plurality of conditions may be jointly used for determining the priority of the panel. For example, a sequence may be set for the plurality of conditions; and if the priority of the panel can be determined by using a former condition, the priority of the panel is determined based on the determining result; or if the priority of the panel cannot be determined by using a former condition, for example, if it is determined, based on the former condition, that priorities of two panels are the same, the priority of the panel is determined by using a latter condition, until priorities of different panels can be distinguished. It should be understood that, in this embodiment of this application, power of a signal may be power for transmitting the signal, where the power for transmitting the signal is determined by the terminal device based on a power control parameter configured by the network device. This is not limited in this embodiment of this application.

For example, the terminal device determines, based on spatial relation information or path loss information corresponding to the signal, that a panel for transmitting a signal is an antenna panel corresponding to good channel quality, and/or determines that a signal that needs to be transmitted is a signal corresponding to good channel quality, where the channel quality is channel quality of a reference signal indicated by spatial relation information or path loss information corresponding to the signal.

It should be understood that, in this embodiment of this application, the spatial relation information corresponding to the signal may also be referred to as spatial relation information of the signal. The spatial relation information of the signal may be configured by the network device, and the terminal device transmits the signal based on the spatial relation information of the signal that is configured by the network device. To be specific, the terminal device determines, based on the spatial relation information, a transmit beam for the terminal device to transmit the signal. Optionally, the spatial relation information of the signal may alternatively be determined in a predefined manner, and the terminal device determines, based on the predefined spatial relation information of the signal, the transmit beam for the terminal device to transmit the signal.

Optionally, a lower path loss of the signal indicates better channel quality of the reference signal.

It should be understood that, in actual application, the terminal device may determine, based on only one of the three pieces of information (1), (2), and (3), an antenna panel for transmitting a signal and/or a signal that needs to be transmitted, or may determine, based on two or more of the three pieces of information, an antenna panel for transmitting a signal and/or a signal that needs to be transmitted. For example, the terminal device may first determine, based on one piece of information, an antenna panel for transmitting a signal and/or a signal that needs to be transmitted; and if no result is determined, the terminal device may further determine, based on another piece of information, an antenna panel for transmitting a signal and/or a signal that needs to be transmitted, until the terminal device can determine a final antenna panel for transmitting a signal and/or a final signal that needs to be transmitted. For another example, a sequence of using the foregoing three pieces of information may exist. For example, the sequence of using the foregoing three pieces of information is: the first piece of information to the third piece of information. To be specific, the terminal device first uses the first piece of information to determine a signal to be transmitted; and if a final result is determined, the other two pieces of information are not considered; or if no final result is determined, the terminal device uses the other two pieces of information in sequence to determine an antenna panel for transmitting a signal and/or a signal that needs to be transmitted, until the terminal device can determine a final result.

It should also be understood that, in this embodiment of this application, the first information may further include other information. To be specific, the terminal device may further determine, based on the other information, an antenna panel for transmitting a signal and/or a signal that needs to be transmitted. This is not limited in this embodiment of this application.

For example, in actual application, at least one antenna panel for transmitting a signal by the terminal device may be determined by the terminal device based on the first information, or may not be determined based on the first information. This is not limited in this embodiment of this application. For example, the at least one antenna panel for transmitting a signal by the terminal device may be determined by the terminal device based on at least one of the following content:

indication information;

a pre-measurement result;

the spatial relation information or the path loss information;

the priority of the panel; and the priority of the signal.

It should be understood that, the indication information may be information indicated by the network device. Herein the network device may explicitly indicate the panel or implicitly indicate the panel by using the indication information. This is not limited in this embodiment of this application.

For example, the network device may explicitly indicate a panel for transmitting a signal by the terminal device. Specifically, when the terminal device accesses the network device, the terminal device may report panel information of the terminal device, and the network device may explicitly indicate, by using signaling, a specific antenna panel for transmitting a signal by the terminal device. It should be understood that, herein the signaling indicating the antenna panel may be signaling same as or different from the signaling in the configuration information in step 210. This is not limited in this embodiment of this application. For another example, the network device explicitly indicates, by using spatial relation information, an antenna panel for transmitting a signal by the terminal device.

For another example, the network device may further implicitly indicate a panel for transmitting a signal by the terminal device. Specifically, the network device may implicitly indicate a panel by using a reference signal resource index or a reference signal resource set index. For example, the network device configures a corresponding reference signal (for example, a sounding reference signal SRS) resource set for each panel of the terminal device. For example, each antenna panel is associated with one or more reference signal resource sets. If a signal to be transmitted by the terminal device or a reference signal in spatial info for transmitting a signal by the terminal device belongs to a reference signal resource set S, it is considered that the terminal device uses a panel associated with the reference signal resource set S to transmit the signal.

It should also be understood that, herein the pre-measurement result is a pre-measurement result based on which the terminal device determines a panel for transmitting a signal. For example, the terminal device may determine, based on a result of beam training measurement, a panel having relatively good channel quality for transmitting a signal. For example, the terminal device may determine a panel for transmitting a signal based on a recent beam training measurement result.

With reference to specific examples, the following separately describes in detail specific solutions in which the terminal device transmits at least one of the M signals by using at least one of the N antenna panels in different cases in this embodiment of this application.

Case 1:

The first information includes the priority of the signal.

For example, M is greater than or equal to 2, the first information includes the priority of the signal, and that the terminal device transmits at least one of the M signals based on the first information by using at least one of the N antenna panels includes:

the terminal device transmits, based on priorities of the M signals by using at least one of the N antenna panels, at least one of the M signals that has a relatively high signal priority.

Specifically, when a base station instructs the terminal device to simultaneously transmit a plurality of pieces of content, the terminal device preferentially transmits a high-priority signal. To be specific, the terminal device may preferentially transmit the high-priority signal. Optionally, if there is an idle panel, the terminal device may further transmit another signal.

Therefore, in this embodiment of this application, preferentially transmitting a high-priority signal can ensure reliable transmission of the high-priority signal.

For example, the network device uses first signaling to instruct to transmit a first signal by using a panel (panel) A and a panel B separately, and uses second signaling to instruct to transmit a second signal by using the panel B. According to a rule for determining a signal priority "a smaller quantity of panels for transmitting a signal that is indicated by the network device indicates a higher priority of the signal", a priority of the second signal is higher than a priority of the first signal. Therefore, the terminal device transmits the second signal by using the panel B. Optionally, the terminal device may further transmit the first signal by using the panel A.

For another example, if the network device instructs, by using the configuration information, the terminal device to transmit a signal on a PRACH and a signal on a PUCCH, the terminal device preferentially transmits the signal on the PRACH according to the foregoing rule for determining a signal priority "a priority of a signal on a PRACH is higher than a priority of a signal on a physical uplink control channel PUCCH". Optionally, if there is a remaining panel, the terminal device may further transmit the signal on the PUCCH. Specifically, a panel for transmitting a signal by the terminal device may be determined in the foregoing manner. For example, the terminal device determines, based on an instruction of the network device and a pre-measurement result, or the like, a panel for transmitting the signal on the PRACH. This is not limited in this embodiment of this application.

Optionally, in an implementation, that the terminal device transmits, based on priorities of the M signals by using at least one of the N antenna panels, at least one of the M signals that has a relatively high signal priority includes:

the terminal device transmits, based on the priorities of the M signals by using at least one of the N antenna panels, one of the M signals that has a highest signal priority.

Specifically, when the network device instructs the terminal device to simultaneously transmit a plurality of signals, the terminal device transmits only a signal having a highest priority, and does not transmit the other signals.

It should be understood that, the panel for transmitting the signal with the highest priority by the terminal device may be a panel indicated by the network device, for example, a panel explicitly or implicitly indicated by the network device; or the panel for transmitting the signal with the highest priority by the terminal device may be determined by the terminal device itself, for example, a panel determined based on a pre-measurement result. This is not limited in this embodiment of this application.

Specifically, the network device may transmit one or more of the following indication information to the terminal: on/off indication information of an antenna panel, identification information (panel ID) of an antenna panel, or indication information of a transmission manner of an uplink signal. Correspondingly, the terminal may receive the indication information transmitted by the network device. The transmission manner of the uplink signal may include transmitting the uplink signal by using a single panel or transmitting the uplink signal by using a plurality of panels. The information directly indicates panels or a quantity of panels that the terminal should use for the M signals. The on/off indication information of the antenna panel may indicate a panel to be enabled or a panel to be disabled. If the on/off indication information indicates the panel to be disabled, a terminal panel other than the panel to be disabled is to be enabled. A first power control parameter is a power control parameter corresponding to an enabled panel in N sets of power control parameters. In specific implementation, the on/off indication information of the antenna panels may be a plurality of bits, where one bit corresponds to one panel and indicates enabling or disabling of the panel. In actual application, the on/off indication information may be further implemented in another manner. This is not limited in this application.

A panel indicated by the identification information (panel ID) of the antenna panel is a panel that the terminal should use for the M signals.

A panel implicitly indicated by the network device is an antenna panel determined based on spatial relation information or measurement information of the terminal device. The antenna panel is determined based on a resource or a resource set or a resource group (resource/resource set/resource group) to which a reference signal indicated by the spatial relation information belongs.

It should be understood that, in this application, a resource or a resource set or a resource group to which a source reference signal belongs is a resource or a resource set or a resource group carrying the source reference signal.

Optionally, a rule for division of resource sets or resource groups may include the following manners:

Manner 1: Reference signals in different resource sets or resource groups can be simultaneously transmitted.

For example, an SRS resource set includes reference signals SRS 1, SRS 2, SRS 3, and SRS 4, and in spatial relations, they correspond to an SRS 7, an SRS 8, an SRS 9, and an SRS 10 in uplink beam management (UL beam management) respectively. The SRS 7 and the SRS 8 are reference signals that belong to a set 1 (or a group 1) and are transmitted by using a panel 1. The SRS 9 and the SRS 10 are reference signals that belong to a set 2 (or a group 2) and are transmitted by using a panel 2. A rule for division of the set 1 (or the group 1) and the set 2 (or the group 2) is that a reference signal in the set 1 (or the group 1) and a reference signal in the set 2 (or the group 2) can be simultaneously transmitted.

Manner 2: Reference signals in a same resource set or resource group can be simultaneously transmitted.

For example, an SRS resource set includes reference signals SRS 1, SRS 2, SRS 3, and SRS 4, and in spatial relations, they correspond to an SRS 7, an SRS 8, an SRS 9, and an SRS 10 in uplink beam management (UL beam management) respectively. The SRS 7 is a reference signal that belongs to a set 1 (or a group 1) and is transmitted by using a panel 1. The SRS 8 is a reference signal that belongs to the set 1 (or the group 1) and is transmitted by using a panel 2. The SRS 8 is a reference signal that belongs to a set 2 (or a group 2) and is transmitted by using the panel 1. The SRS 9 is a reference signal that belongs to the set 2 (or the group 2) and is transmitted by using the panel 2. A rule for division of the set 1 (or the group 1) and the set 2 (or the group 2) is: reference signals in the set 1 (or the group 1) can be simultaneously transmitted, reference signals in the set 2 (or the group 2) can be simultaneously transmitted, and a reference signal in the set 1 (or the group 1) and a reference signal in the set 2 (or the group 2) cannot be simultaneously transmitted.

Optionally, the reference signal (that is, the source reference signal) indicated by the spatial relation information may be a CSI-RS. In specific implementation, during downlink transmission of a CSI-RS, the terminal may determine, by performing beam training on a resource or a resource set or a resource group for receiving the CSI-RS, one or more panels used for receiving the CSI-RS, and record a mapping relationship between the resource or the resource set or the resource group corresponding to the CSI-RS and the panel used for the CSI-RS. In this way, after learning of the resource or the resource set or the resource group to which the source reference signal CSI-RS belongs, the terminal may determine one or more panels for receiving the CSI-RS.

For example, before beam training, the network device configures a plurality of reference signal resource sets or reference signal resource groups. For example, a resource set 1 includes {CSI-RS ID 1, CSI-RS ID 2, CSI-RS ID 3, CSI-RS ID 4}, and a resource set 2 includes {CSI-RS ID 5, CSI-RS ID 6, CSI-RS ID 7, CSI-RS ID 8}. The resource set 1 is used for receive beam training of the panel 1, and the resource set 2 is used for receive beam training of the panel 2. Therefore, the terminal may determine a panel for receiving any one or some of CSI-RSs corresponding to the CSI-RS ID 1 to the CSI-RS ID 8.

Because a spatial feature parameter of the source reference signal CSI-RS is the same as spatial feature parameters of uplink signals carried on M uplink resources or resource sets, a panel used for transmitting an uplink signal is the same as the panel used for receiving the source reference signal CSI-RS.

Optionally, the reference signal (that is, the source reference signal) indicated by the spatial relation information may be an SRS. During uplink transmission of the SRS, the terminal may record a mapping relationship between a resource or a resource set or a resource group corresponding to the source reference signal SRS and one or more panels used for the SRS. In this way, after learning of the resource or the resource set or the resource group to which the source reference signal SRS belongs, the terminal may determine one or more panels for transmitting the source reference signal SRS, and then determine, from sets of N power control parameters, a power control parameter corresponding to the panel, that is, a first power control parameter.

For example, before beam training, the network device configures a plurality of reference signal resource sets or reference signal resource groups. For example, a resource set 1 includes {SRS ID 1, SRS ID 2, SRS ID 3, SRS ID 4}, and a resource set 2 includes {SRS ID 5, SRS ID 6, SRS ID 7, SRS ID 8}. The resource set 1 is used for transmit beam training of the panel 1, and the resource set 2 is used for transmit beam training of the panel 2. Therefore, the terminal may determine a panel for transmitting any one or some of SRSs corresponding to the SRS ID 1 to the SRS ID 8, and determine a first power control parameter.

Because a spatial feature parameter of the source reference signal SRS is the same as a spatial feature parameter of an uplink signal, a panel used for transmitting the uplink signal is the same as the panel used for transmitting the source reference signal SRS.

In this application, indicating a panel may be equivalent to indicating a resource set or a resource group.

Optionally, for the uplink signal, there may be one or more pieces of spatial relation information (in multi-panel transmission). Each piece of spatial relation information may include one reference signal index. Optionally, for the M signals, there may be only one piece of spatial relation information, and each piece of spatial relation information may include one or more reference signals (in multi-panel transmission).

(3) In a Third Implementation, a Quantity of Panels May be Determined Based on a Quantity of Reference Signals that is Indicated by the Spatial Relation Information of the M Signals.

Specifically, the third implementation is applicable to the manner 2 of configuring N sets of power control parameters. If one reference signal corresponds to one panel, the terminal may determine the quantity of panels based on the quantity of reference signals that is indicated by the spatial relation information, thereby determining a transmission manner.

The terminal may further determine a panel based on the spatial relation information in another implementation, in addition to the three implementations described in the foregoing (1) to (3). For example, if one resource set/resource corresponds to one panel, and one resource set/resource corresponds to one piece of spatial relation information, a panel for the M signals may be determined. Optionally, the spatial relation may be an active (active) spatial relation.

The spatial relation information mentioned in this application extends a higher-layer parameter (pucch-SpatialRelationInfo) defined in an existing protocol and describing spatial relation information. In addition to a reference signal (such as an SRS or a CSI-RS) indicated by the high-layer parameter, the reference signal indicated by the spatial relation information mentioned in this application may further include a reference signal (such as a CSI-RS) associated with an uplink resource/resource set (such as an SRS resource set for non-codebook usage) used for non-codebook non-codebook transmission. Herein the reference signal associated with the uplink resource/resource set used for non-codebook non-codebook transmission is a reference signal having a QCL relationship or spatial relation with an uplink signal carried on the uplink resource/resource set used for non-codebook non-codebook transmission.

In this embodiment of this application, the terminal device transmits only one signal having the highest priority. This can avoid interference caused by other signals to the signal having the highest priority, and ensure reliable transmission of the signal having the highest priority.

Optionally, in another implementation, that the terminal device transmits, based on priorities of the M signals by using at least one of the N antenna panels, at least one of the M signals that has a relatively high signal priority includes:

based on the signal priorities corresponding to the M signals, the terminal device transmits, by using a first part of panels in the N antenna panels, a signal that has a highest signal priority, and transmits, by using a second part of panels, a signal that has a second highest signal priority, where an intersection between the first part of panels and the second part of panels is empty, and the first part of panels and the second part of panels belong to the at least one panel.

It should be understood that, in actual application, this embodiment of this application is not limited to transmitting the signal that has the highest priority and the signal that has the second highest signal priority. For example, the terminal device may further transmit a signal that has a third highest priority and a signal that has a fourth highest priority, until the terminal device has no available panel.

It should be understood that, a panel for transmitting a signal by the terminal device may be a panel indicated by the network device, for example, a panel explicitly or implicitly indicated by the network device; or a panel for transmitting a signal by the terminal device may be determined by the terminal device itself, for example, a panel determined based on a pre-measurement result. This is not limited in this embodiment of this application.

Based on whether panels of signals have an intersection, the following describes examples in which the terminal device transmits a high-priority signal.

No intersection exists between panels of signals:

For example, if no intersection exists between a plurality of panels of signals, the terminal device may transmit a corresponding signal based on a panel corresponding to the signal. For example, a panel of a signal is indicated by the network device. For example, the network device instructs a first signal to be transmitted by using the first part of panels, and a second signal to be transmitted by using the second part of panels. Because no intersection exists between the first part of panels and the second part of panels, the terminal device may transmit the first signal by using the first part of panels, and transmit the second signal by using the second part of panels. Alternatively, a priority of the first signal is higher than a priority of the second signal, and the terminal device may transmit the first signal by using only the first part of panels.

For another example, if the network device instructs the terminal device to transmit a plurality of signals, and the terminal device determines that no intersection exists between panels of the plurality of signals, the terminal device may transmit a corresponding signal based on each panel. For example, the network device instructs the terminal device to simultaneously transmit a first signal and a second signal. The terminal device determines that the first signal corresponds to the first part of panels, and that the second signal corresponds to the second part of panels, and that no intersection exists between the first part of panels and the second part of panels. In this case, the terminal device may transmit the first signal by using the first part of panels, and transmit the second signal by using the second part of panels. Alternatively, a priority of the first signal is higher than a priority of the second signal, and the terminal device may transmit the first signal by using only the first part of panels.

Therefore, in this embodiment of this application, preferentially transmitting the signal having the highest priority can ensure reliable transmission of the high-priority signal. The terminal device further transmits other signals while transmitting the signal having the highest priority. Therefore, the terminal device can transmit as many signals as possible, and more service requirements can be satisfied.

An intersection exists between panels of signals:

It should be understood that, a panel of a signal may be a panel indicated by the network device as described above, for example, may be a panel implicitly or explicitly indicated by the network device, or may be a panel determined by the terminal device itself, for example, a panel determined by the terminal device based on a pre-measurement result. This is not limited in this embodiment of this application.

For example, the terminal device has three panels: a panel A, a panel B, and a panel C, where panels of the signal having the second highest priority are a proper subset of panels of the signal having the highest priority. For example, the network device instructs that the signal having the highest priority to be transmitted by using the panels A, B, and C, and the terminal device may transmit a signal in one of the following manners.

Manner 1:

The terminal device transmits, based on a panel of the signal that has the highest priority, the signal that has the highest priority. The other signals are not transmitted (drop).

Therefore, in this embodiment of this application, preferentially transmitting the signal having the highest priority can ensure reliable transmission of the signal having the highest priority.

Manner 2:

In the panels of the signal that has the highest priority (first priority), the panel that has the highest priority is the panel A:

if a panel corresponding to the signal that has the second highest priority (second priority) is the panel A, the signal that has the highest priority is transmitted by using the panels A, B, and C, and the signal that has the second priority is not transmitted (drop);

if a panel of the signal that has the second priority is the panel B, the signal that has the second priority is transmitted by using the panel B, and the signal that has the first priority is transmitted by using the panel A or is transmitted by using the panel A and the panel C; or if the base station instructs the signal having the second priority to be transmitted by using the panel A and the panel B, the signal that has the second priority is transmitted by using the panel B, and content that has the first priority is transmitted by using the panel A or is transmitted by using the panel A and the panel C.

Therefore, in this embodiment of this application, preferentially determining the panel of the signal having the highest priority can ensure reliable transmission of the high-priority signal. The terminal device further transmits the signal that has the second highest priority while transmitting the signal that has the highest priority. Therefore, the terminal device can transmit as many signals as possible, and more service requirements can be satisfied.

For another example, the terminal device has three panels: a panel A, a panel B, and a panel C, where panels of the signal having the first highest priority are a proper subset of panels of the signal having the second highest priority. For example, the network device instructs the signal having the second highest priority to be transmitted by using the panels A, B, and C, and the terminal device may transmit a signal in one of the following manners:

The signal that has the first highest priority is transmitted by using a panel indicated by the base station. A panel, other than the panel of the signal that has the highest priority, in the panels that are indicated by the network device and that are of the signal having the second priority is selected for transmitting the signal that has the second priority.

Therefore, in this embodiment of this application, preferentially determining the panel of the signal having the highest priority can ensure reliable transmission of the high-priority signal. The terminal device further transmits the signal that has the second highest priority while transmitting the signal that has the highest priority. Therefore, the terminal device can transmit as many signals as possible, and more service requirements can be satisfied.

For another example, the terminal device has three panels: a panel A, a panel B, and a panel C, and the network device indicates that an intersection exists between panels of the signal that has the first highest priority and panels of the signal that has the second highest priority. For example, panels of the content that has the first priority are the panel A and the panel B, and panels of the content that has the second priority are the panel A and the panel C. The terminal device may transmit a signal in one of the following manners.

Manner 1:
If the signal that has the first priority is transmitted by using the panel A and the panel B, the signal that has the second priority is transmitted by using the panel C.

Manner 2:
If the panel A is selected for the content that has the first priority, the panel C is selected for the content that has the second priority.

Manner 3:
If the content that has the first priority is transmitted by using the panel B, the panel A and/or the panel C are/is selected for transmitting the content that has the second priority.

Therefore, in this embodiment of this application, preferentially determining a panel of the signal having the highest priority can ensure reliable transmission of the high-priority signal. The terminal device further transmits the signal that has the second highest priority while transmitting the signal that has the highest priority. Therefore, the terminal device can transmit as many signals as possible, and more service requirements can be satisfied.

For another example, the terminal device has three panels: a panel A, a panel B, and a panel C, and the network device indicates that panels of the signal that has the first highest priority and panels of the signal that has the second highest priority are the same, for example, are the panel A, the panel B, and the panel C. The terminal device may transmit a signal in one of the following manners. Manner 1:

The signal that has the first priority is transmitted by using at least one of the panel A, the panel B, and the panel C, and the signal that has the second priority is dropped.

Manner 2:
The signal that has the first priority is transmitted by using one or two of the panel A, the panel B, and the panel C, and the signal that has the second priority is transmitted by using all or a part of remaining panels.

Optionally, in another implementation, the M signals include two signals whose priorities are the same and highest, the two signals correspond to one or more same antenna panels, and that the terminal device transmits, based on priorities of the M signals by using at least one of the N antenna panels, at least one of the M signals that has a relatively high signal priority includes:

the terminal device transmits, by using the one or more antenna panels, one of the two signals that corresponds to a lower path loss or better channel quality of a reference signal indicated by spatial relation information.

To be specific, when the terminal device determines, based on the priority of the signal, a signal to be transmitted, if there are two signals whose priorities are the same and highest, and panels corresponding to the two signals are the same, the terminal device may further determine, based on the spatial relation information or path loss information corresponding to the signal, the signal to be transmitted.

For example, if priorities of a signal 1 and a signal 2 are the same, and the network device indicates that the two signals correspond to a same panel for transmission, one of the two signals that corresponds to a lower path loss (PL) or better channel quality of a reference signal RS indicated by spatial relation information is preferentially transmitted, and the other signal is not transmitted.

For example, the network device indicates that a signal 1 is a PUSCH 1, and previously measured or reported quality of a CSI-RS 1 included in spatial relation info of the PUSCH 1 is −50 dB; and the base station indicates that a signal 2 is a PUSCH 2, and previously measured or reported quality of a CSI-RS 2 included in spatial relation info of the PUSCH 2 is −45 dB. In this case, because channel quality corresponding to the signal 2 is higher than channel quality corresponding to the signal 1, the terminal device transmits the signal 2, and does not transmit the signal 1.

Therefore, in this embodiment of this application, preferentially transmitting a signal having best channel quality can ensure reliable transmission of the signal.

Optionally, in another implementation, the M signals include two signals whose priorities are the same and highest, a first signal in the two signals corresponds to a first antenna panel set, a second signal corresponds to a second antenna panel set, and that the terminal device transmits, based on priorities of the M signals by using at least one of the N antenna panels, at least one of the M signals that has a relatively high signal priority includes:

the terminal device transmits the first signal by using all or a part of panels in the first panel set, where a path loss corresponding to the first signal is lower or channel quality of a reference signal indicated by spatial relation information corresponding to the first signal is better, and optionally, in this case, the terminal device does not transmit the second signal; or the terminal device transmits the first signal by using all or a part of panels in the first panel set, and transmits the second signal by using all or a part of panels in the second panel set other than the panels for transmitting the first signal, where a path loss corresponding to the first signal is lower or channel quality of a reference signal indicated by spatial relation information corresponding to the first signal is better.

To be specific, if priorities of a signal 1 and a signal 2 are the same, and the network device indicates that the two signals both correspond to a plurality of panels for transmission, a panel is preferentially selected for one of the two signals that corresponds to a lower path loss (PL) or better channel quality of a reference signal RS indicated by spatial relation information, and the other signal is transmitted by using another panel or is not transmitted.

Therefore, in this embodiment of this application, preferentially transmitting a signal having good channel quality can ensure reliable transmission of the signal. The terminal device further transmits other signals while transmitting the signal having the best channel quality. Therefore, the terminal device can transmit as many signals as possible, and more service requirements can be satisfied.

Optionally, in another implementation, the M signals include two signals whose priorities are the same and highest, and that the terminal device transmits, based on priorities of the M signals by using at least one of the N antenna panels, at least one of the M signals that has a relatively high signal priority includes:

the terminal device transmits, by using all or a part of panels in the N antenna panels, one of the two signals that corresponds to a lower path loss or better channel quality; or the terminal device transmits, by using a third part of panels in the N antenna panels, one of the two signals that corresponds to a lower path loss or better channel quality of a reference signal indicated by spatial relation information, and transmits the other signal by using a fourth part of panels in the N antenna panels. Optionally, an intersection between the third part of panels and the fourth part of panels may be empty.

To be specific, if priorities of a signal 1 and a signal 2 are the same, but the network device does not indicate antenna panels for the signal 1 and the signal 2, the terminal device preferentially determines a panel for one of the two signals that corresponds to a lower path loss (PL) or better channel quality of a reference signal RS indicated by spatial relation information. For example, the terminal device determines a panel for the signal based on a pre-measurement result, and the other signal is transmitted by using another panel or is not transmitted.

For example, the signal 1 is a signal on a PUSCH, and the signal 2 is a signal on a PRACH. The terminal device may determine, based on pre-measurement, that the signal 1 corresponds to a panel A, and that the signal 2 corresponds to a panel B, and that channel quality of a CSI-RS indicated by spatial relation information corresponding to the signal 1 is higher than channel quality of a CSI-RS indicated by spatial relation information corresponding to the signal 2. In this case, the terminal device transmits the signal 1 by using the panel A and does not transmit the signal 2. Alternatively, optionally, the terminal device transmits the signal 1 by using the panel A and transmits the signal 2 by using the panel B.

Therefore, in this embodiment of this application, preferentially transmitting a signal having good channel quality can ensure reliable transmission of the signal. The terminal device further transmits other signals while transmitting the signal having the best channel quality. Therefore, the terminal device can transmit as many signals as possible, more service requirements can be satisfied, and uplink resource waste can be avoided.

Case 2:

The first information includes a priorities of a panel corresponding to a signal.

In an implementation, that the terminal device transmits at least one of the M signals based on the first information by using at least one of the N antenna panels includes:

the terminal device transmits, based on priorities of panels corresponding to the M signals by using at least one of the N antenna panels, at least one of the M signals that corresponds to a panel having a relatively high priority.

To be specific, when a plurality of signals exist, the terminal device may directly determine, based on the priorities of the panels, a signal that needs to be transmitted, that is, transmit one or more signals that have a relatively high priority.

Therefore, in this embodiment of this application, preferentially transmitting a signal of a high-priority panel can ensure reliable transmission of the signal of the high-priority panel.

Specifically, the panel for transmitting the one or more signals may be indicated by the network device, or may be determined by the terminal device itself. This is not limited in this embodiment of this application.

In another implementation, that the terminal device transmits at least one of the M signals based on the first information by using at least one of the N antenna panels includes:

the terminal device transmits at least one of the M signals based on priorities of panels corresponding to the M signals by using at least one of the N antenna panels that has a relatively high priority.

To be specific, when a plurality of signals exist, the terminal device may directly determine, based on the priorities of the panels, one or more panels having a relatively high priority, and transmit a corresponding signal by using the one or more panels having the relatively high priority.

Therefore, in this embodiment of this application, because channel quality of the high-priority panel is usually good, transmitting the signal by using the high-priority panel can ensure reliable transmission of the signal.

It should be noted that, when a plurality of signals need to be transmitted on a panel having a highest priority or on one of several panels having relatively high priorities, the terminal device may determine, by using a method similar to that in the foregoing case 1, a signal to be transmitted, for example, transmit a signal that corresponds to a relatively low path loss (PL) or better channel quality of a reference signal RS indicated by spatial relation information.

In another implementation, that the terminal device transmits at least one of the M signals based on the first information by using at least one of the N antenna panels includes:

the terminal device transmits, based on priorities of panels corresponding to the M signals by using at least one of the N antenna panels that has a relatively high priority, at least one of the M signals that corresponds to a panel having a relatively high priority.

To be specific, when a plurality of signals exist, the terminal device may directly determine, based on the priorities of the panels, one or more panels having a relatively high priority, and transmit, by using the one or more panels having the relatively high priority, at least one signal that corresponds to the panel or panels having the relatively high priority.

Therefore, in this embodiment of this application, transmitting a signal of a high-priority panel by using the high-priority panel can ensure reliable transmission of the signal.

Case 3:

The first information includes spatial relation information or path loss information corresponding to a signal.

It should be understood that, in the case 3, M may be greater than 1 or may be equal to 1. When M is equal to 1, the terminal device may transmit the signal by directly using a panel corresponding to the signal. Specifically, the panel of the signal may be indicated by the network device, or may be determined by the terminal device itself. This is not limited in this embodiment of this application.

When M is greater than 1, in the case 3, the terminal device needs to select, based on the first information, a signal to be transmitted and/or select a panel for transmitting a signal.

It should be understood that, in this embodiment of this application, channel quality of a reference signal indicated by spatial relation information or path loss information may be corresponding channel quality of a reference signal such as a CSI-RS indicated by the spatial relation information that is previously measured by the terminal device.

It should be noted that, in a current wireless communications system, quality information of a radio channel is generally obtained with help of a transmission reference signal. Generally, different types of reference signals are used in the communications system. One type of reference signal, for example, a cell-specific reference signal (cell-specific reference signal, CRS), is used for channel quality measurement, so that channel quality measurement and cell selection and handover can be implemented. Another type of reference signal is used for channel state information measurement, so that scheduling of the terminal device is implemented. For example, the terminal device may obtain corresponding channel state information CSI based on channel quality measurement of a channel state information reference signal (channel state information reference signal, CSI-RS).

To measure channel quality, the network device may transmit a plurality of reference signals to the terminal device, where a quantity Q of channel quality information that the terminal device is configured to report may be predefined, or is configured by the network device for the terminal device by using signaling, and Q is an integer greater than or equal to 1. The terminal device receives the plurality of reference signals transmitted by the network device, measures, based on the configuration of the network device, all the reference signals transmitted by the network device, obtains Q pieces of best channel quality information, and reports the Q pieces of best channel quality information to the network device.

It should be understood that, in this embodiment of this application, channel quality may be indicated by at least one of the following parameters: layer-1 reference signal received power L1-RSRP, layer-3 reference signal received power L3-RSRP, reference signal received quality RSRQ, a signal to interference plus noise ratio SINR, and a channel quality indicator CQI.

For example, the terminal device has two panels: a panel 1 and a panel 2, where the two panels correspond to CSI-RSs. In this case, during beam training measurement, the terminal device may report reference signal received power RSRP of a CSI-RS corresponding to each panel, for example, RSRP 1 obtained by reception on the panel 1, and RSRP 2 obtained by reception on the panel 2.

In an implementation, that the terminal device transmits at least one of the M signals based on the first information by using at least one of the N antenna panels includes:

the terminal device transmits, based on channel quality of reference signals indicated by spatial relation information or path loss information corresponding to the M signals by using at least one of the N antenna panels, at least one of the M signals that corresponds to relatively good channel quality.

To be specific, in this manner, the terminal device selects, based on the channel quality of the reference signals indicated by the spatial relation information or the path loss information, a signal to be transmitted.

For example, for a signal, if a reference signal indicated or included in the spatial relation information or the path loss information has good channel quality, the signal is transmitted preferentially.

Therefore, in this embodiment of this application, preferentially transmitting a signal having good channel quality can ensure reliable transmission of the signal.

In another implementation, that the terminal device transmits at least one of the M signals based on the first information by using at least one of the N antenna panels includes:

the terminal device transmits at least one of the M signals based on channel quality of reference signals indicated by spatial relation information or path loss information corresponding to the M signals by using at least one of the N antenna panels that corresponds to relatively good channel quality.

To be specific, in this manner, the terminal device selects, based on the channel quality of the reference signals indicated by the spatial relation information or the path loss information, a panel for transmission.

For example, the terminal device determines, based on corresponding RSRP of a downlink reference signal indicated by the spatial relation information, a panel having high RSRP to transmit a signal. For example, the RSRP 1 is higher than RSRP 2. In this case, the terminal device transmits a signal by using a panel 1.

Therefore, in this embodiment of this application, preferentially transmitting a signal by using a panel having good channel quality can ensure reliable transmission of the signal.

In another implementation, that the terminal device transmits at least one of the M signals based on the first information by using at least one of the N antenna panels includes:

the terminal device transmits, based on channel quality of reference signals indicated by spatial relation information or path loss information corresponding to the M signals by using at least one of the N antenna panels that corresponds to relatively good channel quality, at least one of the M signals that corresponds to relatively good channel quality.

To be specific, in this manner, the terminal device selects, based on the channel quality of the reference signals indicated by the spatial relation information or the path loss information, a signal to be transmitted, and selects a panel for transmitting the signal. For example, for a signal, if a reference signal indicated by the spatial relation information or the path loss information has good channel quality, the signal is preferentially transmitted based on a panel corresponding to the reference signal indicated by the spatial relation information or the path loss information.

Therefore, in this embodiment of this application, preferentially transmitting a signal having good channel quality by using a panel having good channel quality can ensure reliable transmission of the signal.

It should be understood that, the foregoing examples in which the terminal device determines an antenna panel for transmitting a signal and/or determines a signal to be transmitted are only illustrative. A person skilled in the art may make various combinations or variations based on the foregoing descriptions. Such modifications shall also fall within the protection scope of the embodiments of this application.

It should be noted that, when the terminal device transmits at least two of the M signals by using the at least two antenna panels, and a sum of configured power of the at least two signals is greater than maximum transmit power of the terminal device, one of the at least two signals is transmitted at the configured power, and the other signals are transmitted at residual power.

The signal transmitted at the configured power may be a signal that has a highest signal priority, or a signal that corresponds to a panel having a highest priority, or a signal that corresponds to best channel quality.

For example, the terminal device needs to transmit two signals: a signal 1 and a signal 2. Assuming that a sum of configured power P1 of the signal 1 and configured power P2 of the content 2 is greater than maximum transmit power Pmax of the terminal device, if a priority of the signal 1 is higher than a priority of the signal 2, the terminal devices transmits the signal at the power P1, and transmits the signal 2 at power Pmax−P1.

Therefore, in this embodiment of this application, using the configured power to transmit the signal that has the highest priority, or the signal that corresponds to the panel having the highest priority, or the signal that corresponds to the highest channel quality can ensure reliable transmission of the signal.

It should be understood that, the foregoing examples are only illustrative. A person skilled in the art may make various combinations or variations based on the foregoing descriptions. Such modifications shall also fall within the protection scope of the embodiments of this application.

It should be understood that, for ease of description, only an example in which one spatial transmit filter transmits one signal or different to-be-transmitted signals correspond to different transmission is used as an example for description in the foregoing example. However, this is not limited in this embodiment of this application. In actual application, one spatial transmit filter may transmit a plurality of signals, and the plurality of signals transmitted by the spatial transmit filter correspond to a same transmit direction. The terminal device may align, by using a receive filter, a receive direction of the receive filter with a transmit direction of the spatial transmit filter to receive the plurality of signals transmitted by the spatial transmit filter. Specifically, for an example in which one spatial transmit filter transmits a plurality of signals, refer to the foregoing descriptions. To avoid repetition, details are not described again herein.

This application further provides the following embodiments. It should be noted that, numbers of the following embodiments do not need to comply with a sequence of numbers of the foregoing embodiments.

The following embodiments mainly discuss a method for indicating or configuring at least one piece of information such as beam indication information, a frequency domain resource start position, and a time domain resource position of a control resource set used for scheduling system information in a wireless communications system. The beam indication information indicates spatial relation information or quasi-co-location QCL assumption information. It is of great importance to configure information of the control resource set, so as to obtain the information of the control resource set and ensure reliable transmission of the system.

The prior art shows that a terminal device obtains information of a control resource set (for example, information such as beam indication information, a frequency domain resource start position, and a time domain resource position of the control resource set) by monitoring an SSB during initial access. The SSB includes at least one of a primary synchronization signal (primary synchronization signal, PSS), a secondary synchronization signal (secondary synchronization signal, SSS), and a PBCH. For ease of description, the following uses a first control resource set to denote a control resource set used at least for scheduling system information. Information about the first control resource set is configured by using a MIB, and MIB information is carried on a PBCH. Therefore, eight bits in the MIB information are used to indicate a possible time-frequency resource position occupied by a control resource set of a first control resource, and an index of a corresponding SSB carrying the MIB information is used to obtain beam information and a frequency domain start position of the first control resource set. Further, monitoring time domain positions (monitoring occasions) of a search space set associated with the first control resource set, or symbol (ofdm symbol) positions of the search space set in a slot (slot) may be obtained. The symbol positions include a position in which an OFDM symbol having a smallest number in time domain in the control resource set associated with the search space set is located in a slot. When the terminal device finds that the first control resource set cannot be detected, the terminal device may obtain information about another first control resource set by monitoring another SSB.

Optionally, the first control resource set may be a CORESET whose identifier is 0, where the CORESET is also referred to as a CORESET 0. Optionally, the first control resource set is further used to schedule one or more of the following information other than the system information (Remaining minimum system information RMS, or referred to as a SIB 1): other system information (other system information, OSI, or referred to as an SI message), a paging (Paging) message, and a random access message. The random access message includes one or more of a second message (Message 2) or a fourth message (Message 4). Optionally, the CORESET 0 may be further associated with a UE-specific search space (UE specific search space, USS), or a common search space may be associated with another CORESET. Optionally, one SSB is associated with one CORESET 0. The terminal device monitors a common search space (common search space, CSS) on the CORESET 0 associated with the SSB. Optionally, the information about the first control resource set may be further configured by using the SIB 1 and/or other system information, or configured by using RRC signaling.

As can be learned from the prior art, once a receive end moves (that is, a beam is unaligned) or a relatively large obstruction appears on a transmission path of a signal (that is, the beam is blocked), an antenna gain of the signal decreases greatly. Consequently, signals of the receive end are frequently interrupted, the first control resource set cannot be detected, and the terminal device needs to monitor a plurality of other SSBs to search for an available first control resource set. Therefore, monitoring complexity and delay are increased, and system information cannot be received in time. In addition, if the first control resource set is further associated with a USS, when a link of the first control resource set is broken, the terminal device can obtain, only by monitoring a new SSB, a CSS associated with a new first control resource set or scheduled system information, but cannot obtain information scheduled in the USS. The system information is transmitted to all or some terminal devices in the cell by using broadcast information, and is transmitted repeatedly on a plurality of SSBs, but non-broadcast information scheduled in the USS is transmitted only once. Therefore, to resolve the foregoing problem, the present invention provides a method for indicating information about a first control resource set.

Embodiment 1: A communication method, where the method includes:

a terminal device receives MAC-CE signaling, where the MAC-CE signaling is used to indicate quasi-co-location QCL information of a first control resource set, where the first control resource set is a control resource set used at least for scheduling system information.

As can be learned from the foregoing method, in comparison with the prior art, a network device can indicate beam information of a CORESET 0 more flexibly in Embodiment 1, and this avoids a case in which a terminal device cannot update beam information in time and cannot receive system information due to moving.

Embodiment 2: The method according to Embodiment 1, where the MAC-CE signaling indicates one or more pieces of QCL information in candidate QCL information of a physical downlink shared channel PDSCH; or the MAC-CE signaling indicates one or more pieces of QCL information in candidate QCL information of a second control resource set.

For example, optionally, the second control resource set is a control resource set used for receiving a random access message. Optionally, the second control resource set and the first control resource set are control resource sets in a same BWP.

As can be learned from the foregoing method, in comparison with a method for configuring QCL information for the CORESET 0 separately, the candidate QCL information of the PDSCH or another control resource set is reused as candidate QCL information of the CORESET 0, and this can effectively reduce resource overheads. In addition, beam information of the same BWP has an association relationship. Because a candidate QCL set of the PDSCH or another control resource set in the same BWP is reused, better QCL information of the CORESET 0 for transmission can be selected, and better receiving quality can be obtained.

Embodiment 3: The method according to Embodiment 1 or Embodiment 2, where the QCL information includes information about an SSB, or the QCL information includes information about a CSI-RS satisfying a QCL relationship with an SSB.

Embodiment 4: The method according to Embodiment 3, where the terminal device determines a time-frequency resource of the first control resource set based on the information about the SSB.

For example, the time-frequency resource includes one or more of the following resources:

a frequency domain start position, monitoring time domain positions (monitoring occasions) of a search space set associated with the first control resource set, and symbol (ofdm symbol) positions of the search space set in a slot (slot).

The symbol positions include a position in which an OFDM symbol having a smallest number in time domain in the control resource set associated with the search space set is located in a slot.

In the foregoing method, thanks to an association relationship between the information about the SSB and the time-frequency resource of the CORESET 0, the time-frequency resource of the CORESET 0 may be determined by reusing an SSB index included or indirectly associated in the QCL information of the CORESET 0, and this effectively reduces overheads.

Embodiment 5: The method according to Embodiment 4, where the terminal device monitors a downlink control channel PDCCH on the time-frequency resource of the first control resource set based on the one or more pieces of QCL information.

Embodiment 6: The method according to any one of Embodiment 1 to Embodiment 5, where the information about the SSB is an index of the SSB.

Embodiment 7: The method according to Embodiment 2, further including: the terminal device receives RRC signaling, where the RRC signaling indicates the candidate QCL information of the PDSCH.

The candidate QCL information of the PDSCH is available QCL information used for receiving the PDSCH.

Optionally, time of receiving the RRC signaling in Embodiment 7 is earlier than or equal to time of receiving the MAC-CE signaling in Embodiment 1.

Embodiment 8: The method according to Embodiment 2, further including: the terminal device receives RRC signaling, where the RRC signaling indicates the candidate QCL information of the second control resource set.

The candidate QCL information of the second control resource set is available QCL information used for receiving the second control resource set.

Optionally, time of receiving the RRC signaling in Embodiment 8 is earlier than or equal to time of receiving the MAC-CE signaling in Embodiment 1.

Embodiment 9: The method according to Embodiment 1 to Embodiment 8, where a bandwidth part BWP in which the PDSCH is located or a BWP in which the second control resource set is located is one of the following BWPs:

an initial BWP, a current active BWP, a BWP in which the first control resource set is located, and a BWP including the SSB.

Embodiment 10: The QCL information of the first control resource set is QCL information of the second control resource set.

The first control resource set is a control resource set used at least for scheduling system information.

Optionally, the second control resource set is a control resource set used for receiving a random access message. Optionally, the second control resource set and the first control resource set are control resource sets in a same BWP. Optionally, the QCL information of the second control resource set is information activated by using RRC signaling or MAC-CE signaling and used for receiving the second control resource set.

Embodiment 11: A communication method, including:

a network device transmits MAC-CE signaling, where the MAC-CE signaling is used to indicate quasi-co-location QCL information of a first control resource set, where the first control resource set is a control resource set used at least for scheduling system information.

Embodiment 12: The method according to Embodiment 11, where the MAC-CE signaling indicates one or more pieces of QCL information in candidate QCL information of a physical downlink shared channel PDSCH; or the MAC-CE signaling indicates one or more pieces of QCL information in candidate QCL information of a second control resource set.

For example, optionally, the second control resource set is a control resource set used for receiving a random access message. Optionally, the second control resource set and the first control resource set are control resource sets in a same BWP.

Embodiment 13: The method according to Embodiment 11 or Embodiment 12, where the QCL information includes information about an SSB, or the QCL information includes information about a CSI-RS satisfying a QCL relationship with an SSB.

Embodiment 14: The method according to Embodiment 13, where the information about the SSB is further used to determine a time-frequency resource of the first control resource set.

For example, the time-frequency resource includes one or more of the following resources:

a frequency domain start position, monitoring time domain positions (monitoring occasions) of a search space set associated with the first control resource set, and symbol (ofdm symbol) positions of the search space set in a slot (slot).

The symbol positions include a position in which an OFDM symbol having a smallest number in time domain in the control resource set associated with the search space set is located in a slot.

Embodiment 15: The method according to Embodiment 14, where the terminal device monitors a downlink control channel PDCCH on the time-frequency resource of the first control resource set based on the one or more pieces of QCL information.

Embodiment 16: The method according to any one of Embodiment 11 to Embodiment 15, where the information about the SSB is an index of the SSB.

Embodiment 17: The method according to Embodiment 12, further including: the network device transmits RRC signaling, where the RRC signaling indicates the candidate QCL information of the PDSCH.

In this embodiment of this application, because the RRC signaling is not used to configure candidate QCLs for the first control resource set, overheads can be reduced.

The candidate QCL information of the PDSCH is available QCL information used for receiving the PDSCH.

Optionally, time of transmitting the RRC signaling in Embodiment 17 is earlier than or equal to time of transmitting the MAC-CE signaling in Embodiment 11.

Embodiment 18: The method according to Embodiment 12, further including: the network device transmits RRC signaling, where the RRC signaling indicates the candidate QCL information of the second control resource set.

The candidate QCL information of the second control resource set is available QCL information used for receiving the second control resource set.

Optionally, time of transmitting the RRC signaling in Embodiment 18 is earlier than or equal to time of transmitting the MAC-CE signaling in Embodiment 11.

Embodiment 19: The method according to Embodiment 11 to Embodiment 18, where a BWP in which the PDSCH is located or a BWP in which the second control resource set is located is one of the following BWPs:

an initial BWP, a current active BWP, a BWP in which the first control resource set is located, and a BWP including the SSB.

In the foregoing embodiments, the QCL information may be replaced with transmission configuration indicator (transmission configuration indicator, TCI) information.

The TCI information is used to indicate a PDCCH/CORESET or QCL information of the PDSCH. The TCI information indicates that a reference signal included in a TCI and a DMRS for the PDCCH/PDSCH satisfy a QCL relationship, and is mainly used to indicate that during reception of the PDCCH/PDSCH, information such as a spatial receiving parameter of the PDCCH/PDSCH is the same as, similar to, or approximate to information such as a spatial receiving parameter of the reference signal included in the TCI.

The following briefly explains concepts of a bandwidth part (bandwidth part, BWP) and a control resource set.

1. Initial BWP

When the terminal device in an RRC idle state accesses a cell or a wideband carrier, a BWP in initial access of the terminal device is referred to as an initial BWP (initial BWP), or it may be understood that the terminal device performs random access on the initial BWP.

2. Active (Active) BWP

When a service arrives at the terminal device, the network device schedules the terminal device from the initial BWP to a BWP whose bandwidth matches the service of the terminal device, and may indicate, by using higher-layer signaling or layer-1 signaling, a current BWP on which the terminal device operates. The network device and the terminal device may transmit or receive data and/or a reference signal on this BWP. This BWP is referred to as an active BWP. In a case of a single carrier or one serving cell, one terminal device has only one active BWP at a moment, and the terminal device can receive data or a reference signal or transmit data or a reference signal only on the active BWP.

Dynamic BWP switching is supported in a current communications system. By using downlink control information (downlink control information, DCI) or radio resource control (radio resource control, RRC) signaling, the network device instructs the terminal device to perform BWP switching. The DCI is located in the current BWP, and a size of a frequency domain resource allocation information field of the DCI is determined by a bandwidth size of the current BWP. The DCI includes a bandwidth part indicator (bandwidth part indicator) information field used to indicate an ID number of a BWP activated by the terminal device. When the BWP ID number indicated by the information field is inconsistent with an ID number of the current active BWP (that is, the current BWP for transmitting the DCI) of the terminal device, the terminal device needs to switch from the current BWP to the BWP indicated by the DCI.

It should be understood that, in this application, the following explanations about a control resource set may be provided. To improve efficiency of blindly detecting a control channel by the terminal device, a concept of a control resource set (control resource set, referred to as a CORESET hereinafter) is put forward in a process of formulating an NR standard. The network device may configure one or more resource sets for UE, for transmitting a PDCCH. The network device may transmit, to the terminal device, a control channel on any control resource set corresponding to the terminal device. In addition, the network device needs to further notify the terminal device of other configurations associated with the control resource set, for example, a search space set. Configuration information of each control resource set is different. For example, there is a frequency domain width difference or a time domain length difference. Extensively, the control resource set in this application may be a CORESET or a control region (control region) or an ePDCCH set (set) defined in a 5G mobile communications system.

It should be understood that, each of the foregoing Embodiment 1 to Embodiment 19 may be used as a separate embodiment, or the embodiments may be mutually combined or nested. Division of the plurality of embodiments is only for ease of description of the solution of this application, and the plurality of embodiments shall not be construed as any limitation on implementation processes of the embodiments of this application. It should also be understood that, various modifications or variations may be made based on the examples in the foregoing Embodiment 1 to Embodiment 19. Such modifications or variations shall also fall within the scope of the embodiments of the present invention.

It should be understood that, the foregoing examples in FIG. 1 to FIG. 3 are only intended to help a person skilled in the art understand the embodiments of the present invention, instead of limiting the embodiments of the present invention to specific values or specific scenarios in the examples. A person skilled in the art apparently can make various equivalent modifications or changes based on the examples shown in FIG. 1 to FIG. 3, and such modifications or changes shall also fall within the scope of the embodiments of the present invention.

It should be understood that, sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes in detail the methods of the embodiments of the present invention with reference to FIG. 1 to FIG. 3. The following describes communications apparatuses of the embodiments of the present invention with reference to FIG. 4 to FIG. 7.

Figure 4:
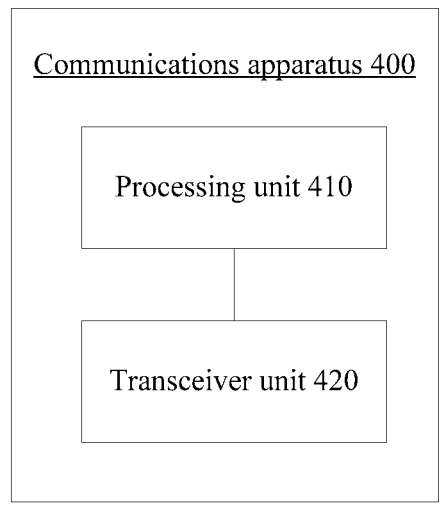
FIG. 4 is a schematic block diagram of a communications apparatus according to this application.

FIG. 4 is a schematic structural diagram of a communications apparatus according to an embodiment of this application. The communications apparatus 400 may include:

a processing unit 410 and a transceiver unit 420.

Specifically, the processing unit is configured to control the transceiver unit to: receive configuration information, where the configuration information is used to configure the transceiver unit to transmit M signals in a first time unit, the communications apparatus has N antenna panels, M is an integer greater than or equal to 1, and N is an integer greater than or equal to 2; and transmit at least one of the M signals based on first information by using at least one of the N antenna panels.

Therefore, according to this embodiment of this application, a terminal device can select a panel based on the first information and select a signal that needs to be transmitted. This embodiment of this application provides a solution of determining a signal that needs to be transmitted, and can further resolve a problem that a panel cannot be selected to transmit a signal in the prior art.

Optionally, M is greater than or equal to 2, the first information includes priorities of signals, and the transceiver unit is specifically configured to:

transmit, based on priorities of the M signals by using at least one of the N antenna panels, at least one of the M signals that has a relatively high signal priority.

Optionally, the priority of the signal satisfies at least one of the following conditions:

a signal to be transmitted by using fewer panels has a higher priority;

a priority of a signal on a physical random access channel PRACH is higher than a priority of a signal on a physical uplink control channel PUCCH, a priority of a signal on a PUCCH is higher than a priority of a signal on a physical uplink data channel PUSCH, or a priority of a signal on a PUSCH is higher than a priority of a sounding reference signal SRS;

a signal that occupies more resource blocks RBs has a higher priority;

a signal to be transmitted by using a higher resource bandwidth has a higher priority;

a signal to be transmitted by using more data layers has a higher priority; and a priority of a signal on a time domain resource is higher than a priority of a signal on a subsequent time domain resource.

Optionally, the first information includes a priority of a panel corresponding to the signal, and the transceiver unit is specifically configured to:

transmit, based on priorities of panels corresponding to the M signals by using at least one of the N antenna panels, at least one of the M signals that corresponds to a panel having a relatively high priority; or transmit at least one of the M signals based on priorities of panels corresponding to the M signals by using at least one of the N antenna panels that has a relatively high priority; or transmit, based on priorities of panels corresponding to the M signals by using at least one of the N antenna panels that has a relatively high priority, at least one of the M signals that corresponds to a panel having a relatively high priority.

Optionally, the priority of the panel satisfies at least one of the following conditions:

better channel quality of a reference signal indicated by spatial relation information corresponding to a signal indicates a higher priority of a panel corresponding to the signal;

a lower path loss of a signal indicates a higher priority of a panel corresponding to the signal;

higher power of a signal indicates a higher priority of a panel corresponding to the signal; and a smaller index of a panel indicates a higher priority of the panel.

Optionally, the first information includes spatial relation information or path loss information corresponding to the signal, and the transceiver unit is specifically configured to:

transmit, based on channel quality of reference signals indicated by spatial relation information or path loss information corresponding to the M signals by using at least one of the N antenna panels, at least one of the M signals that corresponds to relatively good channel quality; or transmit at least one of the M signals based on channel quality of reference signals indicated by spatial relation information or path loss information corresponding to the M signals by using at least one of the N antenna panels that corresponds to relatively good channel quality; or transmit, based on channel quality of reference signals indicated by spatial relation information or path loss information corresponding to the M signals by using at least one of the N antenna panels that corresponds to relatively good channel quality, at least one of the M signals that corresponds to relatively good channel quality.

Optionally, a lower path loss of the signal indicates better channel quality of the reference signal.

Optionally, the at least one antenna panel is determined based on at least one of the following:

indication information;

a pre-measurement result;

the spatial relation information or the path loss information;

the priority of the panel; and the priority of the signal.

Optionally, the transceiver unit is specifically configured to:

transmit, based on the priorities of the M signals by using at least one of the N antenna panels, one of the M signals that has a highest signal priority; or based on the signal priorities corresponding to the M signals, transmit, by using a first part of panels in the N antenna panels, a signal that has a highest signal priority, and transmit, by using a second part of panels, a signal that has a second highest signal priority, where an intersection between the first part of panels and the second part of panels is empty, and the first part of panels and the second part of panels belong to the at least one panel.

Optionally, the M signals include two signals whose priorities are the same and highest; and the two signals correspond to one or more same antenna panels, and the transceiver unit is specifically configured to transmit, by using the one or more antenna panels, one of the two signals that corresponds to a lower path loss or better channel quality of a reference signal indicated by spatial relation information; or a first signal in the two signals corresponds to a first antenna panel set, a second signal corresponds to a second antenna panel set, and the transceiver unit is specifically configured to: transmit the first signal by using all or a part of panels in the first panel set, where a path loss corresponding to the first signal is lower or channel quality of a reference signal indicated by spatial relation information corresponding to the first signal is better; or transmit, by the terminal device, the first signal by using all or a part of panels in the first panel set, and transmit the second signal by using all or a part of panels in the second panel set other than the panels for transmitting the first signal, where a path loss corresponding to the first signal is lower or channel quality of a reference signal indicated by spatial relation information corresponding to the first signal is better; or the transceiver unit is specifically configured to: transmit, by using all or a part of panels in the N antenna panels, one of the two signals that corresponds to a lower path loss or better channel quality; or transmit, by the terminal device by using a third part of panels in the N antenna panels, one of the two signals that corresponds to a lower path loss or better channel quality of a reference signal indicated by spatial relation information, and transmit the other signal by using a fourth part of panels in the N antenna panels.

Optionally, when the transceiver unit transmits at least two of the M signals by using at least two of the N antenna panels, and a sum of configured power of the at least two signals is greater than maximum transmit power of the terminal device, one of the at least two signals is transmitted at the configured power, and the other signals are transmitted at residual power.

Therefore, according to this embodiment of this application, the terminal device can select a panel based on the first information and select a signal that needs to be transmitted. This embodiment of this application provides a solution of determining a signal that needs to be transmitted, and can further resolve a problem that a panel cannot be selected to transmit a signal in the prior art.

The communications apparatus 400 provided by this application may correspond to a process performed by the terminal device in the method embodiment in FIG. 2. For a function of each unit/module in the communications apparatus, refer to the foregoing descriptions. Detailed descriptions are appropriately omitted herein.

It should be understood that, the communications apparatus in FIG. 4 may be a terminal device, or may be a chip or an integrated circuit installed in the terminal device.

Figure 5:
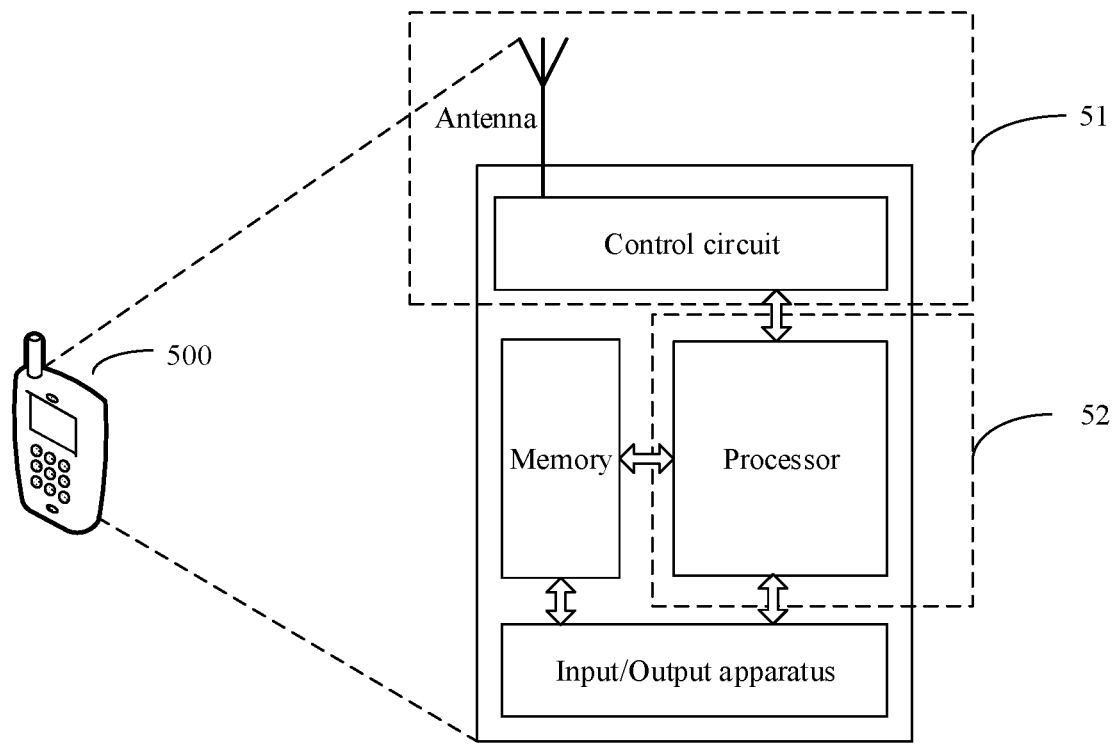
FIG. 5 is a schematic block diagram of a terminal device according to this application.

For example, the communications apparatus is a terminal device. FIG. 5 is a schematic structural diagram of a terminal device according to an embodiment of this application. For ease of understanding and illustration, in FIG. 5, for example, the terminal device is a mobile phone. FIG. 5 shows only main parts of the terminal device. The terminal device 500 shown in FIG. 5 includes a processor, a memory, a control circuit, and an antenna. Optionally, the terminal device may further include an input/output apparatus. It should be understood that, the control circuit may be disposed in the processor, or may be located outside the processor and exists independently. This is not limited in this embodiment of this application. The processor is mainly configured to process a communication protocol and communication data, control the entire terminal device, execute a software program, and process data of the software program, for example, configured to support the terminal device in performing actions described in the foregoing method embodiment. The memory is mainly configured to store the software program and data. The control circuit is mainly configured to perform conversion between a baseband signal and a radio frequency signal and process a radio frequency signal. The control circuit and the antenna may also be together referred to as a transceiver, and are mainly configured to transmit or receive a radio frequency signal in a form of an electromagnetic wave. The input/output apparatus, for example, a touchscreen, a display, or a keyboard, is mainly configured to receive data input by a user and output data to the user.

After the terminal device is powered on, the processor may read the software program in a storage unit, interpret and execute an instruction of the software program, and process data of the software program. When data needs to be transmitted in a wireless manner, after the processor performs baseband processing on the to-be-transmitted data, the processor outputs a baseband signal to a radio frequency circuit. The radio frequency circuit performs radio frequency processing on the baseband signal, and then transmits a radio frequency signal in a form of an electromagnetic wave. When data is transmitted to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 5 shows only one memory and one processor. In an actual terminal device, a plurality of processors and memories may exist. The memory may also be referred to as a storage medium, a storage device, or the like. This is not limited in this embodiment of this application. It should be understood that, the memory may be integrated in the processor, or may be located outside the processor and exists independently. This is not limited in this embodiment of this application.

In an optional implementation, the processor may include a baseband processor and a central processing unit. The baseband processor is mainly configured to process a communication protocol and communication data. The central processing unit is mainly configured to control the entire terminal device, execute a software program, and process data of the software program. The processor in FIG. 5 may integrate functions of the baseband processor and the central processing unit. A person skilled in the art may understand that, alternatively, the baseband processor and the central processing unit may be independent processors, and interconnected by using a technology such as a bus. A person skilled in the art may understand that, the terminal device may include a plurality of baseband processors to adapt to different network standards. The terminal device may include a plurality of central processing units to enhance processing capabilities of the terminal device. Each part of the terminal device may be connected by using various buses. The baseband processor may also be expressed as a baseband processing circuit or a baseband processing chip. The central processing unit may also be expressed as a central processing circuit or a central processing chip. Functions for processing the communication protocol and communication data may be built in the processor, or may be stored in the storage unit in a form of a software program. The processor executes the software program to implement a baseband processing function.

In this embodiment of the present invention, a control circuit and an antenna that has transmitting and receiving functions may be considered as a transceiver unit 51 of the terminal device 500, for example, configured to support the terminal device in performing the transmitting and receiving functions performed by the terminal device in the method embodiment shown in FIG. 2. A processor having a processing function is considered as a processing unit 52 of the terminal device 500, and corresponds to the processing unit 410 in FIG. 4. As shown in FIG. 5, the terminal device 500 includes a transceiver unit 51 and a processing unit 52. The transceiver unit may also be referred to as a transceiver device, a transceiver, a transceiver apparatus, or the like, and the transceiver unit corresponds to the transceiver unit 420 in FIG. 4. Optionally, a component configured to implement a receiving function in the transceiver unit 51 may be considered as a receiving unit, and a component configured to implement a transmitting function in the transceiver unit 51 may be considered as a transmitting unit. To be specific, the transceiver unit 51 includes a receiving unit and a transmitting unit. The receiving unit may also be referred to as a receiver, an input interface, a receiving circuit, or the like. The transmitting unit may be referred to as a transmitter, a transmitting device, a transmitting circuit, or the like.

The processing unit 52 may be configured to execute an instruction stored in the memory, to control the transceiver unit 51 to receive a signal and/or transmit a signal, and implement functions of the terminal device in the foregoing method embodiment. In an implementation, it may be considered that the functions of the transceiver unit 51 are implemented by a transceiver circuit or a dedicated transceiver chip.

It should be understood that, the terminal device 500 shown in FIG. 5 can implement each process of the terminal device in the method embodiment in FIG. 2. Operations and/or functions of the modules in the terminal device 500 are intended to implement corresponding procedures in the foregoing method embodiment. For details, refer to the descriptions in the foregoing method embodiment. To avoid repetition, detailed descriptions are appropriately omitted herein.

Figure 6:
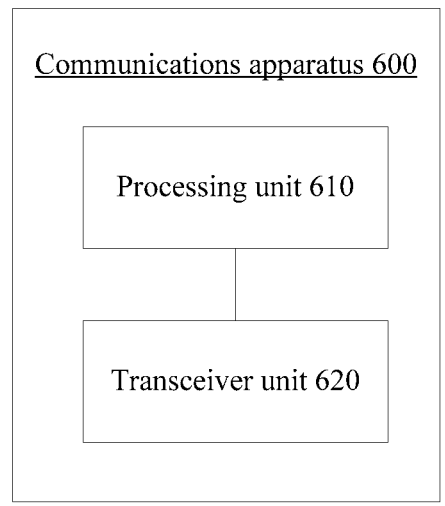
FIG. 6 is a schematic block diagram of another communications apparatus according to this application.

FIG. 6 is a schematic structural diagram of a communications apparatus according to an embodiment of this application. The apparatus 600 may include:

a processing unit 610 and a transceiver unit 620.

The processing unit is configured to control the transceiver unit to: transmit configuration information, where the configuration information is used to configure a terminal device to transmit M signals in a first time unit, the terminal device has N antenna panels, M is an integer greater than or equal to 1, and N is an integer greater than or equal to 2; and receive at least one of the M signals that is transmitted by the terminal device based on first information by using at least one of the N antenna panels.

Therefore, according to this embodiment of this application, the terminal device can select a panel based on the first information and select a signal that needs to be transmitted. This embodiment of this application provides a solution of determining a signal that needs to be transmitted, and can further resolve a problem that a panel cannot be selected to transmit a signal in the prior art.

Optionally, the first information includes at least one of the following information:

a priority of a signal;

a priority of a panel corresponding to a signal; and spatial relation information or path loss information corresponding to a signal.

Optionally, the priority of the signal satisfies at least one of the following conditions:

a signal to be transmitted by using fewer panels has a higher priority;

a priority of a signal on a physical random access channel PRACH is higher than a priority of a signal on a physical uplink control channel PUCCH, a priority of a signal on a PUCCH is higher than a priority of a signal on a physical uplink data channel PUSCH, or a priority of a signal on a PUSCH is higher than a priority of a sounding reference signal SRS;

a signal that occupies more resource blocks RBs has a higher priority;

a signal to be transmitted by using a higher resource bandwidth has a higher priority;

a signal to be transmitted by using more data layers has a higher priority; and a priority of a signal on a time domain resource is higher than a priority of a signal on a subsequent time domain resource.

Optionally, the priority of the panel satisfies at least one of the following conditions:

better channel quality of a reference signal indicated by spatial relation information corresponding to a signal indicates a higher priority of a panel corresponding to the signal;

a lower path loss of a signal indicates a higher priority of a panel corresponding to the signal;

higher power of a signal indicates a higher priority of a panel corresponding to the signal; and a smaller index of a panel indicates a higher priority of the panel.

The communications apparatus 600 provided by this application may correspond to a process performed by the network device in the method embodiment in FIG. 2. For a function of each unit/module in the communications apparatus, refer to the foregoing descriptions. Detailed descriptions are appropriately omitted herein.

It should be understood that, the communications apparatus in FIG. 6 may be a network-side device, or may be a chip or an integrated circuit installed in the network-side device.

It should be understood that, the network-side device may represent any network device communicating with the terminal device, or may represent an entirety formed by a plurality of network devices communicating the terminal device. This is not limited in this embodiment of this application.

Figure 7:
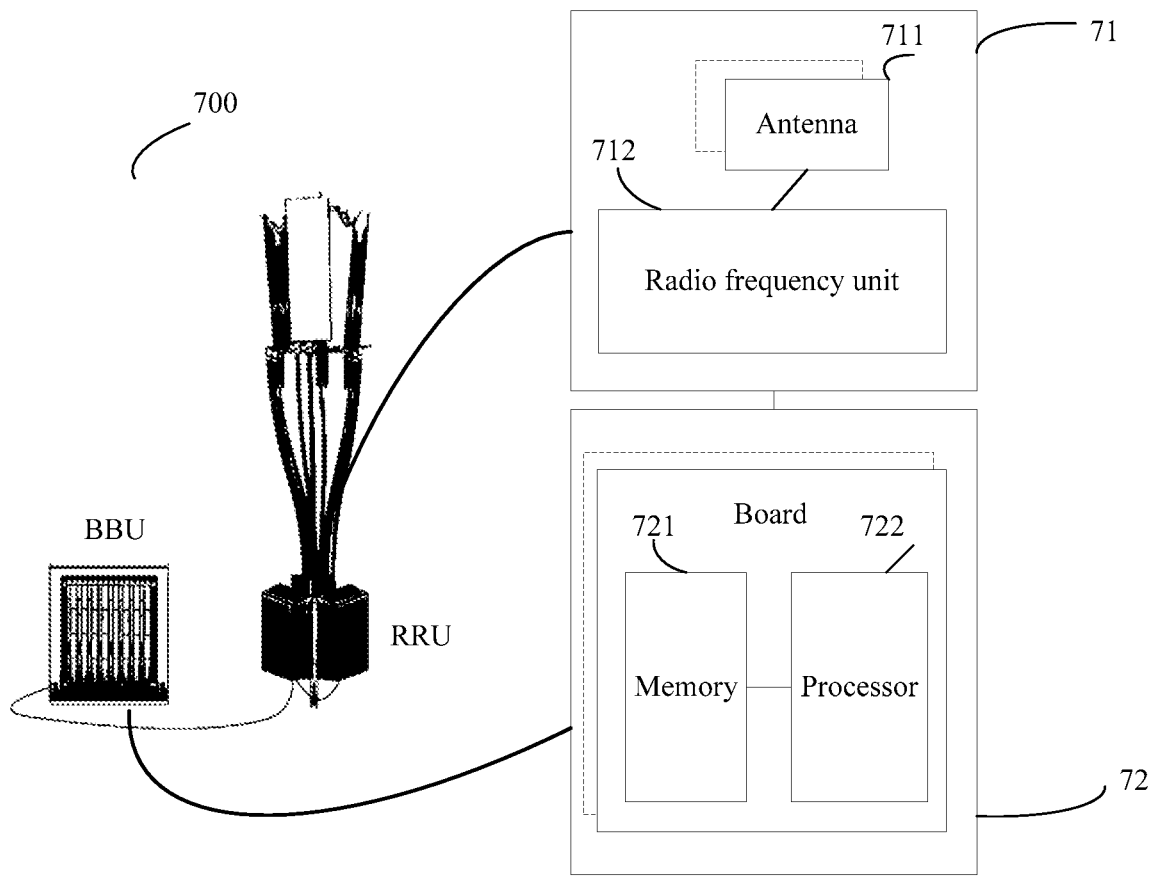
FIG. 7 is a schematic block diagram of a network device according to this application.

For example, the communications apparatus is a network device communicating with the terminal device. FIG. 7 is a schematic structural diagram of a network device according to an embodiment of this application, for example, may be a schematic structural diagram of a base station. As shown in FIG. 7, the network device 700 may be applied to the system shown in FIG. 1, and performs functions of the network device in the foregoing method embodiment.

The network device 700 may include one or more radio frequency units, for example, a remote radio unit (remote radio unit, RRU) 71 and one or more baseband units (baseband unit, BBU) (which may also be referred to as a digital unit, digital unit, DU) 72. The RRU 71 may be referred to as a transceiver unit 71, and corresponds to the transceiver unit 620 in FIG. 6. Optionally, the transceiver unit may also be referred to as a transceiver, a transceiver circuit, a transceiver device, or the like, and may include at least one antenna 711 and a radio frequency unit 712. The RRU 71 part is mainly configured to transmit or receive a radio frequency signal and perform conversion between a radio frequency signal and a baseband signal, for example, configured to transmit precoding matrix information to the terminal device. The BBU 72 part is mainly configured to perform baseband processing, control the base station, or the like. The RRU 71 and the BBU 72 may be physically disposed together, or may be physically disposed separately, that is, a distributed base station.

The BBU 72 is a control center of the base station, or may be referred to as a processing unit 72. The BBU 72 may correspond to the processing unit 610 in FIG. 6, and is mainly configured to implement a baseband processing function, for example, channel coding, multiplexing, modulation, or spreading. For example, the BBU (processing unit) may be configured to control the base station to perform an operation procedure of the network device in the foregoing method embodiment.

In an example, the BBU 72 may include one or more boards, where the plurality of boards may jointly support a radio access network (such as an LTE network in a single access mode, or may respectively support radio access networks (such as an LTE network, a 5G network, or other networks) in different access modes. The BBU 72 further includes a memory 721 and a processor 722. The memory 721 is configured to store a necessary instruction and necessary data. The processor 722 is configured to control the base station to perform a necessary action, for example, configured to control the base station to perform an operation procedure of the network device in the foregoing method embodiment. It should be understood that, the memory may be integrated in the processor, or may be located outside the processor and exists independently. This is not limited in this embodiment of this application. The memory 721 and the processor 722 may serve one or more boards. To be specific, a memory and a processor may be disposed on each board; or a same memory and a same processor may be shared by a plurality of boards. In addition, a necessary circuit may be disposed on each board.

It should be understood that, the network device 700 shown in FIG. 7 can implement each process of the network device in the method embodiment in FIG. 2. Operations and/or functions of the modules in the network device 700 are intended to implement corresponding procedures in the foregoing method embodiment. For details, refer to the descriptions in the foregoing method embodiment. To avoid repetition, detailed descriptions are appropriately omitted herein.

An embodiment of this application further provides a processing apparatus, including a processor and an interface, where the processor is configured to perform the communication method in any one of the foregoing method embodiments.

It should be understood that, the processing apparatus may be a chip. For example, the processing apparatus may be a field programmable gate array (Field Programmable Gate Array, FPGA), or may be an application-specific integrated circuit (Application-Specific Integrated Circuit, ASIC), or may be a system on chip (System on Chip, SoC), or may be a central processing unit (Central Processor Unit, CPU), or may be a network processor (Network Processor, NP), or may be a digital signal processing circuit (Digital Signal Processor, DSP), or may be a micro control unit (Micro Controller Unit, MCU), or may be a programmable controller (Programmable Logic Device, PLD), or another integrated chip.

In an implementation process, steps of the foregoing methods can be implemented by using a hardware integrated logic circuit in the processor, or by using instructions in a form of software. The steps of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware of the processor. To avoid repetition, details are not described again herein.

It should be noted that, the processor in this embodiment of the present invention may be an integrated circuit chip, and has a signal processing capability. In an implementation process, steps in the foregoing method embodiments can be implemented by using a hardware integrated logic circuit in the processor, or by using instructions in a form of software. The foregoing processor may be a general purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component. It may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by a hardware decoding processor, or may be executed and accomplished by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware of the processor.

It may be understood that, the memory in the embodiments of the present invention may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM), and a direct rambus dynamic random access memory (direct Rambus RAM, DR RAM). It should be noted that, the memory in the systems and methods described in this specification includes but is not limited to these and any memory of another appropriate type.

An embodiment of this application further provides a communications system, including the foregoing network device and terminal device.

An embodiment of this application further provides a computer-readable medium. The computer-readable medium stores a computer program, and when the computer program is executed by a computer, the method in any one of the foregoing method embodiments is implemented.

An embodiment of this application further provides a computer program product. When the computer program product is executed by a computer, the method in any one of the foregoing method embodiments is implemented.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD), a semiconductor medium (for example, a solid-state drive (solid state disk, SSD)), or the like.

It should be understood that, although the foregoing describes a communication method in downlink transmission in a communications system, this application is not limited thereto. Optionally, a solution similar to that in the foregoing description may also be used in uplink transmission. To avoid repetition, details are not described again herein.

The network device and the terminal device in the foregoing apparatus embodiments completely correspond to the network device and the terminal device in the method embodiments. A corresponding module or unit performs a corresponding step. For example, a transmitting module (a transmitter) performs a transmitting step in the method embodiment, a receiving module (a receiver) performs a receiving step in the method embodiment, and steps other than transmitting and receiving may be performed by a processing module (a processor). For a function of a specific module, refer to the corresponding method embodiment. The transmitting module and the receiving module may form a transceiver module, and the transmitter and the receiver may form a transceiver to jointly implement transmitting and receiving functions. There may be one or more processors.

In this application, the term "at least one" indicates one or more, and the term "a plurality of" indicates two or more. The term "and/or" describes an association relationship for describing associated objects and represents that three relationships may exist. For example, A and/or B may represent the following cases: Only A exists, both A and B exist, and only B exists, where A and B may be in a singular or plural form. The character "/" generally indicates an "or" relationship between the associated objects. The term "at least one of the following items (pieces)" or an expression similar to the term indicates any combination of the items, and includes a single item (piece) or any combination of a plurality of items (pieces). For example, at least one item (piece) of a, b, or c may indicate: a, b, c, a-b, a-c, b-c, or a-b-c, where a, b, and c may be in a singular or plural form.

It should be understood that, "one embodiment" or "an embodiment" mentioned in the whole specification means that particular features, structures, or characteristics related to the embodiment are included in at least one embodiment of this application. Therefore, "in one embodiment" or "in an embodiment" appearing throughout this specification does not refer to a same embodiment. In addition, these particular features, structures, or characteristics may be combined in one or more embodiments in any appropriate manner. It should be understood that, sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should also be understood that, the terms "first", "second", "third", "fourth", and various numbers in this specification are used only for distinguishing for ease of description, and are not intended to limit the scope of the embodiments of this application.

It should be understood that, the term "and/or" in this specification describes only an association relationship for describing associated objects and represents that three relationships may exist. For example, A and/or B may represent the following three cases: Only A exists, both A and B exist, and only B exists.

A person of ordinary skill in the art may be aware that, illustrative logical blocks (illustrative logical block) and steps (step) described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for

What is claimed is:

1. A communication method, comprising:
    transmitting a radio resource control (RRC) signaling, wherein the RRC signaling indicates candidates of spatial information of a physical downlink shared channel (PDSCH); and
    transmitting medium access control control element (MAC-CE) signaling, wherein the MAC-CE signaling indicates one piece of spatial information for a first control resource set, wherein the one piece of spatial information is selected from the candidates of spatial information of the PDSCH, and wherein the first control resource set is a control resource set used at least for transmitting scheduling information of system information, the first control resource set is a control resource set whose identifier is 0, and the spatial information is quasi-co-location (QCL) information.

2. The method according to claim 1, wherein the spatial information comprises information about a channel state information reference signal (CSI-RS) satisfying a QCL relationship with a synchronization signal and physical broadcast channel block (SSB).

3. The method according to claim 2, wherein the method further comprises: determining a time-frequency resource of the first control resource set based on information about the SSB, wherein the time-frequency resource comprises monitoring occasions of a search space set associated with the first control resource set.

4. The method according to claim 2, wherein the method further comprises: transmitting a downlink control channel (PDCCH) on a time-frequency resource of the first control resource set based on the spatial information, wherein the time-frequency resource comprises monitoring occasions of a search space set associated with the first control resource set.

5. The method according to claim 3, wherein the information about the SSB is an index of the SSB.

6. A processing apparatus, comprising at least one processor, and one or more memories coupled to the at least one processor and storing programming instructions for execution by the at least one processor to perform operations comprising:
    transmitting a radio resource control (RRC) signaling, wherein the RRC signaling indicates candidates of spatial information of a physical downlink shared channel (PDSCH); and
    transmitting medium access control control element (MAC-CE) signaling, wherein the MAC-CE signaling indicates one piece of spatial information for a first control resource set, wherein the one piece of spatial information is selected from the candidates of spatial information of the PDSCH, and wherein the first control resource set is a control resource set used at least for transmitting scheduling information of system information, the first control resource set is a control resource set whose identifier is 0, and the spatial information is quasi-co-location (QCL) information.

7. The processing apparatus according to claim 6, wherein the spatial information comprises information about a channel state information reference signal (CSI-RS) satisfying a QCL relationship with a synchronization signal and physical broadcast channel block (SSB).

8. The processing apparatus according to claim 7, wherein the operations comprises:
    determining a time-frequency resource of the first control resource set based on information about the SSB, wherein the time-frequency resource comprises monitoring occasions of a search space set associated with the first control resource set.

9. The processing apparatus according to claim 7, wherein the operations comprises:
transmitting a downlink control channel (PDCCH) on a time-frequency resource of the first control resource set based on the spatial information, wherein the time-frequency resource comprises monitoring occasions of a search space set associated with the first control resource set.

10. The processing apparatus according to claim 8, wherein the information about the SSB is an index of the SSB.

11. The processing apparatus according to claim 6, wherein the processing apparatus is a chip or a network device.

12. A non-transitory computer-readable storage medium, wherein the non-transitory computer-readable storage medium stores a computer program or an instruction, and when the computer program or the instruction is executed by one or more processors, the computer program or the instruction causes a communication device to perform following operations:
transmitting a radio resource control (RRC) signaling, wherein the RRC signaling indicates candidates of spatial information of a physical downlink shared channel (PDSCH); and
transmitting medium access control control element (MAC-CE) signaling, wherein the MAC-CE signaling indicates one piece of spatial information for a first control resource set, wherein the one piece of spatial information is selected from the candidates of spatial information of the PDSCH, and wherein the first control resource set is a control resource set used at least for transmitting scheduling information of system information, the first control resource set is a control resource set whose identifier is 0, and the spatial information is quasi-co-location (QCL) information.

13. The non-transitory computer-readable storage medium according to claim 12, wherein the spatial information comprises information about a channel state information reference signal (CSI-RS) satisfying a QCL relationship with a synchronization signal and physical broadcast channel block (SSB).

14. The non-transitory computer-readable storage medium according to claim 13, wherein the operations further comprise: determining a time-frequency resource of the first control resource set based on information about the SSB, wherein the time-frequency resource comprises monitoring occasions of a search space set associated with the first control resource set.

15. The non-transitory computer-readable storage medium according to claim 13, wherein the operations further comprise: transmitting a downlink control channel (PDCCH) on a time-frequency resource of the first control resource set based on the spatial information, wherein the time-frequency resource comprises monitoring occasions of a search space set associated with the first control resource set.

16. The non-transitory computer-readable storage medium according to claim 14, wherein the information about the SSB is an index of the SSB.

17. A communication method, comprising:
receiving a radio resource control (RRC) signaling, wherein the RRC signaling indicates candidates of spatial information of a physical downlink shared channel (PDSCH); and
receiving medium access control control element (MAC-CE) signaling, wherein the MAC-CE signaling indicates one piece of spatial information for a first control resource set, wherein the one piece of spatial information is selected from the candidates of spatial information of the PDSCH, and wherein the first control resource set is a control resource set used at least for transmitting scheduling information of system information, the first control resource set is a control resource set whose identifier is 0, and the spatial information is quasi-co-location (QCL) information.

18. The method according to claim 17, wherein the spatial information comprises information about a channel state information reference signal (CSI-RS) satisfying a QCL relationship with a synchronization signal and physical broadcast channel block (SSB).

19. The method according to claim 18, wherein the method further comprises: determining a time-frequency resource of the first control resource set based on information about the SSB, wherein the time-frequency resource comprises monitoring occasions of a search space set associated with the first control resource set.

20. The method according to claim 18, wherein the method further comprises: receiving a downlink control channel (PDCCH) on a time-frequency resource of the first control resource set based on the spatial information, wherein the time-frequency resource comprises monitoring occasions of a search space set associated with the first control resource set.

21. The method according to claim 19, wherein the information about the SSB is an index of the SSB.

22. A processing apparatus, comprising at least one processor, and one or more memories coupled to the at least one processor and storing programming instructions for execution by the at least one processor to perform operations comprising:
receiving a radio resource control (RRC) signaling, wherein the RRC signaling indicates candidates of spatial information of a physical downlink shared channel (PDSCH); and
receiving medium access control control element (MAC-CE) signaling, wherein the MAC-CE signaling indicates one piece of spatial information for a first control resource set, wherein the one piece of spatial information is selected from the candidates of spatial information of the PDSCH, and wherein the first control resource set is a control resource set used at least for transmitting scheduling information of system information, the first control resource set is a control resource set whose identifier is 0, and the spatial information is quasi-co-location (QCL) information.

23. The processing apparatus according to claim 22, wherein the spatial information comprises information about a channel state information reference signal (CSI-RS) satisfying a QCL relationship with a synchronization signal and physical broadcast channel block (SSB).

24. The processing apparatus according to claim 23, wherein the operations comprises:
determining a time-frequency resource of the first control resource set based on information about the SSB, wherein the time-frequency resource comprises monitoring occasions of a search space set associated with the first control resource set.

25. The processing apparatus according to claim 23, wherein the operations comprises:
receiving a downlink control channel (PDCCH) on a time-frequency resource of the first control resource set based on the spatial information, wherein the time-frequency resource comprises monitoring occasions of a search space set associated with the first control resource set.

26. The processing apparatus according to claim 24, wherein the information about the SSB is an index of the SSB.

27. The processing apparatus according to claim 22, wherein the processing apparatus is a chip or a terminal device.

28. A non-transitory computer-readable storage medium, wherein the non-transitory computer-readable storage medium stores a computer program or an instruction, and when the computer program or the instruction is executed by one or more processors, the computer program or the instruction causes a communication device to perform following operations:

receiving a radio resource control (RRC) signaling, wherein the RRC signaling indicates candidates of spatial information of a physical downlink shared channel (PDSCH); and receiving medium access control control element (MAC-CE) signaling, wherein the MAC-CE signaling indicates one piece of spatial information for a first control resource set, wherein the one piece of spatial information is selection from the candidates of spatial information of the PDSCH, and wherein the first control resource set is a control resource set used at least for transmitting scheduling information of system information, the first control resource set is a control resource set whose identifier is 0, and the spatial information is quasi-co-location (QCL) information.

29. The non-transitory computer-readable storage medium according to claim 28, wherein the spatial information comprises information about a channel state information reference signal (CSI-RS) satisfying a QCL relationship with a synchronization signal and physical broadcast channel block (SSB).

30. The non-transitory computer-readable storage medium according to claim 29, wherein the operations further comprise: determining a time-frequency resource of the first control resource set based on information about the SSB, wherein the time-frequency resource comprises monitoring occasions of a search space set associated with the first control resource set.

31. The non-transitory computer-readable storage medium according to claim 29, wherein the operations further comprise: receiving a downlink control channel (PDCCH) on a time-frequency resource of the first control resource set based on the spatial information, wherein the time-frequency resource comprises monitoring occasions of a search space set associated with the first control resource set.

32. The non-transitory computer-readable storage medium according to claim 30, wherein the information about the SSB is an index of the SSB.

* * * * *